June 29, 1943.   P. J. McLAREN   2,322,767
COMPUTING AND REGISTERING MECHANISM
Filed Jan. 11, 1939   19 Sheets-Sheet 3

INVENTOR
Peter J. McLaren
BY Moses & Nolte
ATTORNEYS

June 29, 1943.   P. J. McLAREN   2,322,767
COMPUTING AND REGISTERING MECHANISM
Filed Jan. 11, 1939    19 Sheets-Sheet 5

INVENTOR
Peter J. McLaren
BY Moses & Nolte
ATTORNEYS

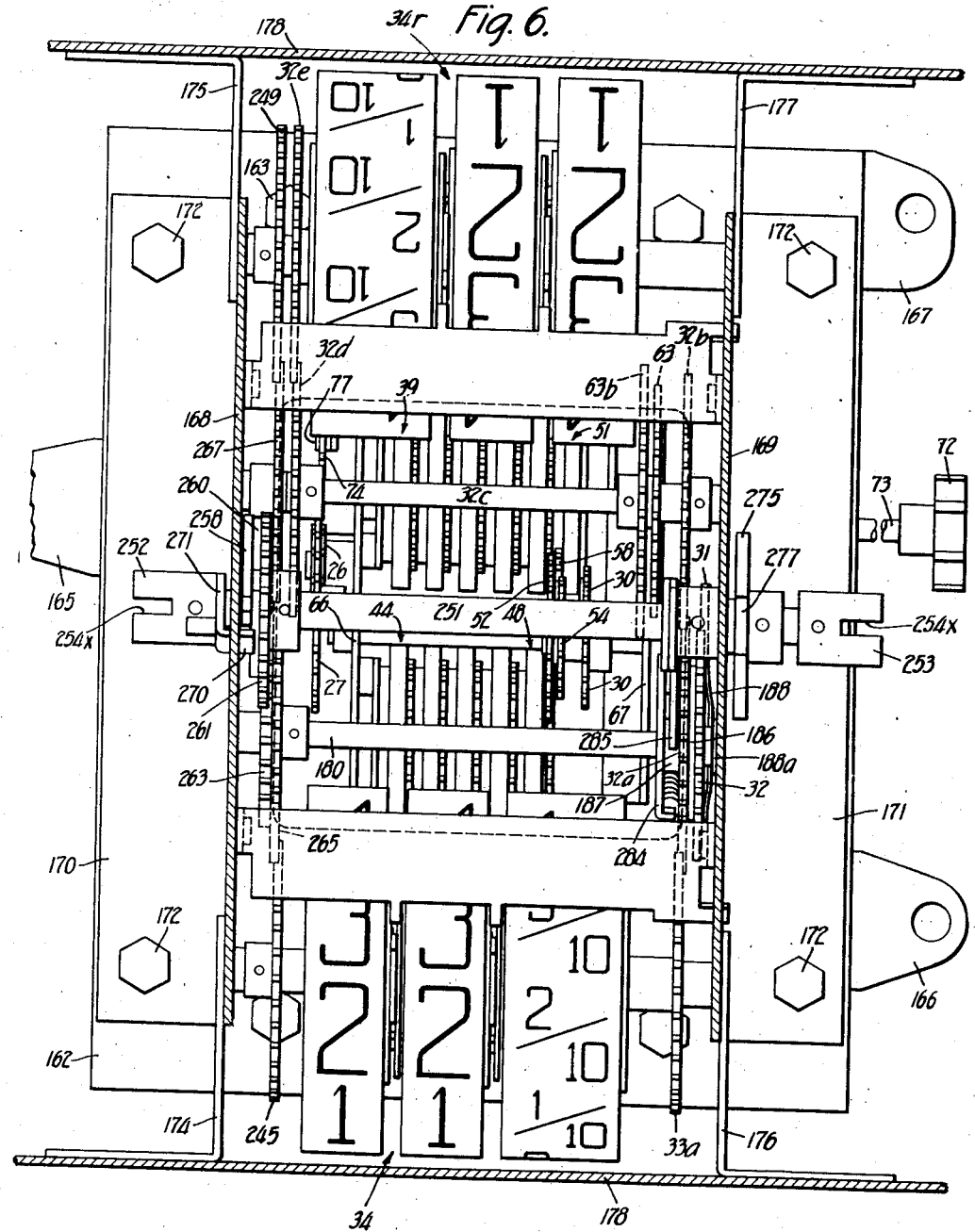

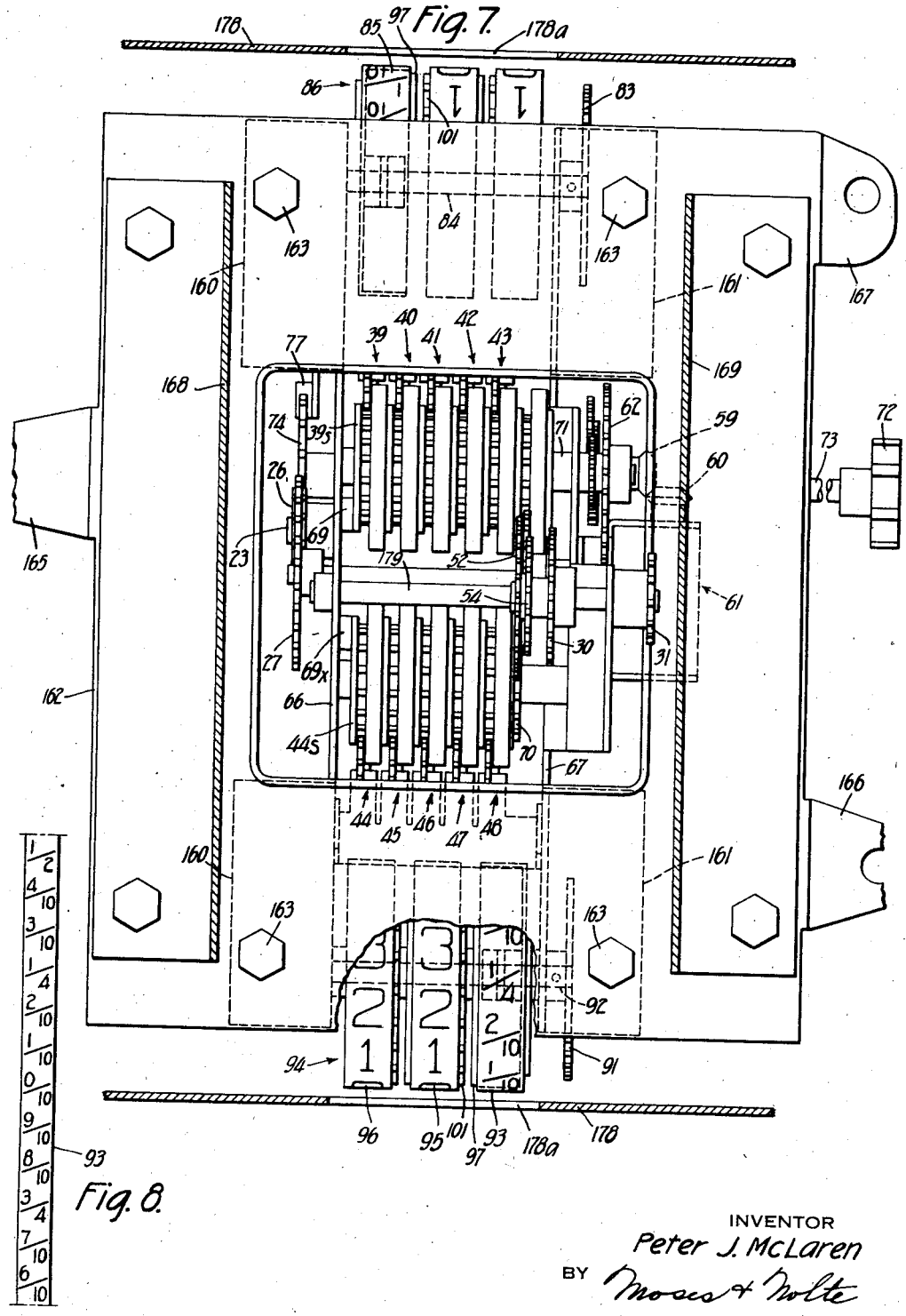

June 29, 1943.  P. J. McLAREN  2,322,767
COMPUTING AND REGISTERING MECHANISM
Filed Jan. 11, 1939  19 Sheets-Sheet 8

INVENTOR
Peter J. McLaren
BY Moses & Nolte
ATTORNEYS

June 29, 1943.  P. J. McLAREN  2,322,767
COMPUTING AND REGISTERING MECHANISM
Filed Jan. 11, 1939  19 Sheets-Sheet 11
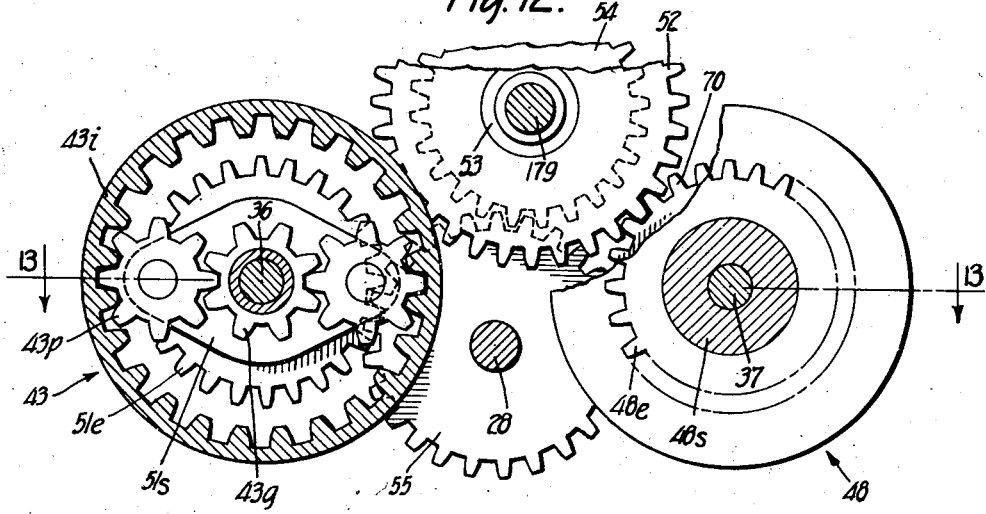
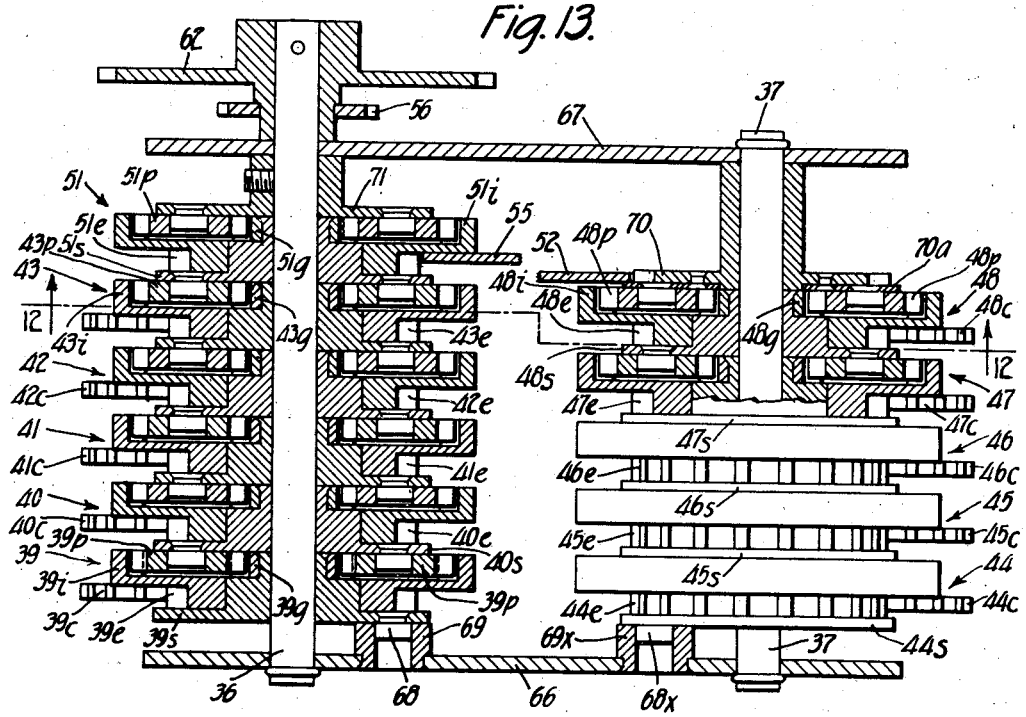
INVENTOR
Peter J. McLaren
BY Moses & Nolte
ATTORNEYS June 29, 1943.  P. J. McLAREN  2,322,767
COMPUTING AND REGISTERING MECHANISM
Filed Jan. 11, 1939  19 Sheets-Sheet 12
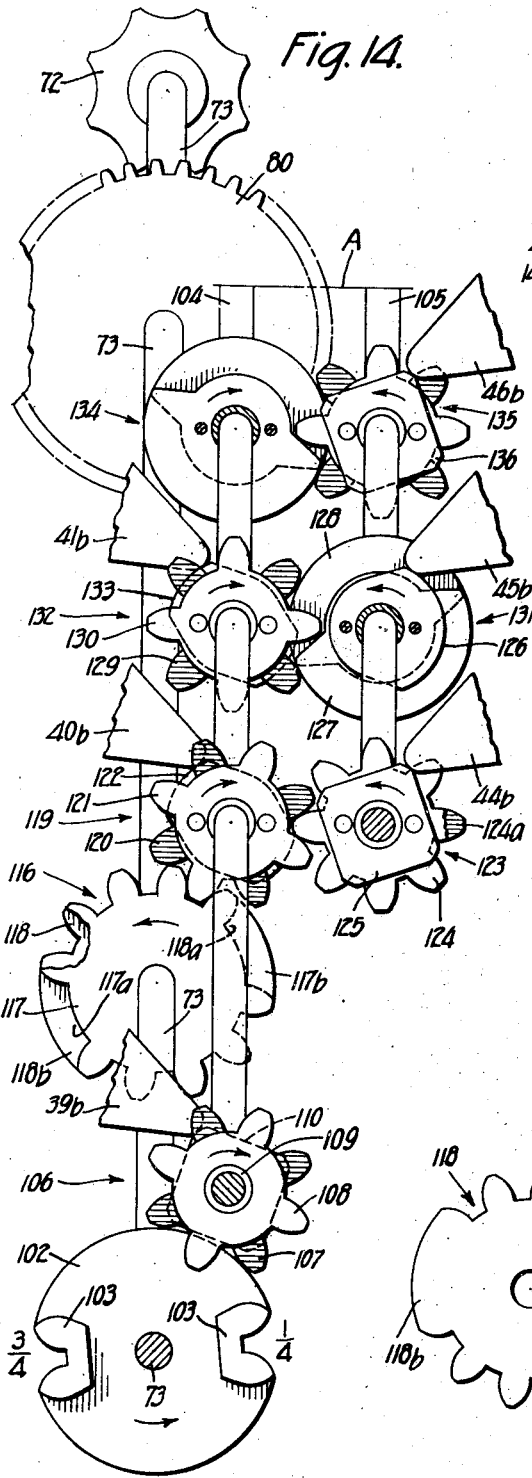
Fig. 14.
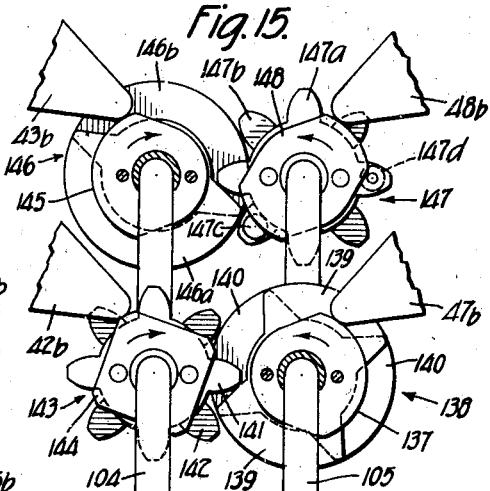
Fig. 15.
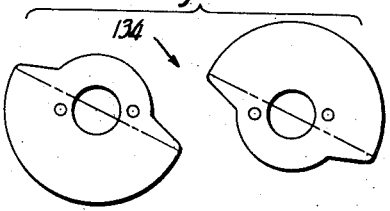
Fig. 16.
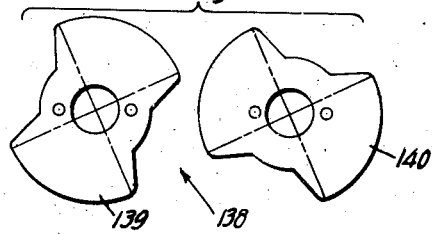
Fig. 17.
Fig. 18.
INVENTOR
Peter J. McLaren
BY Moses & Nolte
ATTORNEYS June 29, 1943.　　　P. J. McLAREN　　　2,322,767
COMPUTING AND REGISTERING MECHANISM
Filed Jan. 11, 1939　　19 Sheets-Sheet 19

→ Cost Input
--→ Gallons "
--→ Cost Zero-setting
--→ Gallons "

INVENTOR
Peter J. McLaren
BY Moses & Nolte
ATTORNEYS

Patented June 29, 1943

2,322,767

UNITED STATES PATENT OFFICE 2,322,767

COMPUTING AND REGISTERING MECHANISM

Peter J. McLaren, New York, N. Y.

Application January 11, 1939, Serial No. 250,312

7 Claims. (Cl. 235—61)

This invention relates to computing and indicating mechanism, and more particularly to mechanism which may be operated, say, to set up the rate or price per unit of a commodity as a multiplicand, to run in the number of units or quantity as the multiplier, and to compute and exhibit the product of the two as the selling price. The invention is disclosed herein with particular reference to its utilization in connection with dispensing apparatus such as the gasoline pumps used at gasoline filling stations. Such disclosure is, however, to be regarded as illustrative, since the invention will, of course, be recognized as capable of other uses.

It is an important object of the invention to provide a mechanism of the character stated in which all of the operating parts are of small mass and inertia, and therefore capable of being started and stopped quickly and with a minimum expenditure of power.

In a register for use with gasoline dispensing pumps it is desirable that the price per gallon, the number of gallons, and the resulting product or selling price of the quantity of gasoline delivered be all clearly indicated at opposite sides of the pump so that the purchaser seated in his vehicle may read them, regardless of the side of the pump at which he may happen to draw up. These requirements are met in accordance with the present invention by providing like rate indicators, like quantity registers, and like price registers at opposite sides of the pump, and provision is made for operating the corresponding indicators or registers in common and in unison with one another.

The quantity and sale price registers are really sub-total registers with reference to the quantity of gasoline delivered and the money received through a series of sales, since they require to be re-set to zero after each sale. It is also desirable, however, that total quantity and money registers be provided so that the proprietor of the station may be afforded a check upon the quantity of gasoline delivered and upon the total price received for the gasoline over a period of time, which total registers should be incapable of reverse operation and should be inaccessible to the operatives of the station. In accordance with the present invention, total registers of the kind referred to are provided, and mechanism is also provided for simultaneously setting the two sales quantity registers and the two sales price registers back to zero at a single operation, without affecting the registers.

The present invention is, with respect to the multiplying mechanism, an improvement upon the invention disclosed and claimed in the co-pending application of Peter J. McLaren, Serial No. 160,052, filed August 20, 1937, for Variable speed mechanism, now Patent No. 2,177,611, and with respect to the register mechanism and the operating means therefor an improvement upon the invention disclosed and claimed in the pending application of Peter J. McLaren, Serial No. 206,570, filed May 7, 1938, for Counters, now Patent No. 2,177,437.

In Serial No. 160,052 disclosure is made of a series of differentials adapted to be coupled selectively and individually, or in any desired combination, with a common input or driving member, and of means for controlling and setting up various combinations of the differentials so as to secure any integral driving ratio in regular and uninterrupted sequence between the common input member and a common output member over a wide range. Broadly, this is accomplished by so arranging the differentials that each will have a definite individual driving value, and that the relation between the driving values of the several differentials will represent successive terms of a geometrical series constituting powers of the number "2." If the first term of such a series be taken as 1 and the highest term as $2^{n-1}$, then the terms of this series may be taken individually and in various combinations for securing any integral number from 1 through $2^{n-1}$.

In accordance with one illustrative disclosure of Serial No. 160,052, the differentials are arranged in two banks, and each differential of a given bank has an input value four times as great as the neighboring differential of that bank of next lower value. The two banks, however, feed into a common output, and one bank has twice the output value of the other. Thus, one bank puts in values such as 1, 4, 16, 64, etc., while the other puts in values such as 2, 8, 32, 128, etc., the two banks combining to produce input values for the individual differentials corresponding to the complete geometric series 1, 2, 4, 8, 16, 32, 64, 128, etc. This arrangement and this mode of operation are desirably adhered to in the practice of the present invention.

In connection with gasoline dispensing pumps, it is desirable that the successive available multiplicands shall occur at intervals of one-tenth of a cent, subject, however, to the exception that there shall be also available multiplicands corresponding to each whole number of cents plus one-quarter of a cent, and to each whole number of cents plus three-quarters of a cent. So far as the matter of tenths is concerned, no particular difficulty is involved for, if decimal indicators and registers are employed, the principle of operation will be the same whether the dial wheel of lowest denomination be a units wheel or a tenths wheel. The introduction of any common multiplier or divisor is only a matter of gear ratios employed in the common output train. The fact, however, that the quarter and three-quarter values are interpolated into the regular series, introduces an irregularity into the order of multiplicand increments and presents a special problem. The solution of this problem represents an important object of the present invention.

This problem is solved in the following manner:

The differential of lowest value is made to represent .05 cent, while the other differentials represent, respectively, .1 cent, .2 cent, .4 cent, .8 cent, 1.6 cents, etc. If the differential having the value of .05 cent were invariably idle, and the regular rule of sequence of combinations pointed out in Serial No. 160,052 were adhered to with reference to the other differentials, each successively available multiplicand would be greater than its predecessor by .1 cent. For such a mode of operation, each step of the multiplicand indexing member should bring up a new combination of the series. It will be observed, however, that starting from zero the first step should bring up .1 cent, the second .2 cent, but that the third should bring up .25 cent. Then the next five steps should bring up .3 cent, .4 cent, .5 cent, .6 cent and .7 cent, but the sixth ensuing step should bring up .75 cent. After the setting up of the .2 cent multiplicand, therefore, the .05 cent differential should be thrown in and the remaining differentials should be left undisturbed. The same thing will recur six steps later when setting up the .75 cent multiplicand, and there will be this same recurrence at every sixth step thereafter. In accordance with the invention, provision is made for throwing in the .05 cent differential at the third, ninth, fifteenth, twenty-first and twenty-seventh step, and so on, and for throwing it out at the fourth, tenth, sixteenth, twenty-second and twenty-eighth step, and so on. Provision is also made for causing a dwell of the mechanism which controls the other differentials at the third, ninth, fifteenth, twenty-first and twenty-seventh step and so on.

This is desirably accomplished by providing a multiplicand indexing shaft having two Geneva gears upon it with the rotation of the shaft divided into twelve equal steps. One of the Geneva gears is arranged to operate the control mechanism for the .05 cent differential to throw that differential into action at the third and ninth steps of the indexing shaft, but to hold it out and unoperated from the fourth step through the eighth and from the tenth step of one revolution through the second step of the next. The other Geneva gear acts upon and operates the control mechanism for the remaining differentials at the steps when the first Geneva gear produces no operation or a disconnecting operation, but holds such control mechanism idle at the steps which throw the .05 cent differential into action.

A further feature of the invention has to do with the setting up of the multiplicand indicator to indicate successively, step by step, the available multiplicands of the irregular series referred to. To this end, the multiplicand setting shaft is geared to drive the wheel of lowest denomination, which is the fractions wheel, of the multiplicand indicator through twelve equal steps for each revolution of the wheel. The periphery of the wheel is divided into twelve distinct symbol bearing spaces, all of the same extent, and these spaces are marked in sequence with the fractions which are used. The lowest denomination wheel carries over to the units wheel at every twelfth step, but from the units wheel on the multiplicand indicator is a regular decimal counter which carries over at every tenth step from the units wheel to the tens wheel.

A further feature of the invention has to do with improved means for effecting control of the multiplying differentials. In accordance with the disclosure of Serial No. 160,052, a series of control cams is provided for each differential bank, the cams for each bank being arranged in successive units or groups, but the cams of the two banks being unconnected to one another, save for the fact that a common drive is provided for them. In accordance with the present invention, however, the mechanism is simplified and made more compact by causing the Geneva drive from unit to unit to pass back and forth between cam units of the two banks.

Other objects and advantages will hereinafter appear.

In the drawings forming part of this specification and illustrating a practical and advantageous embodiment of the invention:

Figures 1 and 2, taken together illustrate diagrammatically the general principle of operation of the apparatus;

Figure 6 is a horizontal sectional view taken on the line 6—6 of Figure 3 looking in the direction of the arrows;

Figure 7 is a horizontal sectional view taken on the line 7—7 of Figure 3 looking in the direction of the arrows;

Figure 8 is a developed view of the face of the lowest denomination wheel of one of the multiplicand or rate indicators;

Figure 12 is a fragmentary detail sectional view illustrating certain details, differential construction and the arrangement of the differential banks in relation to certain associated gearing;

Figure 13 is a sectional plan view taken upon the line 13—13 of Figure 12 and looking in the direction of the arrows;

Figure 10:
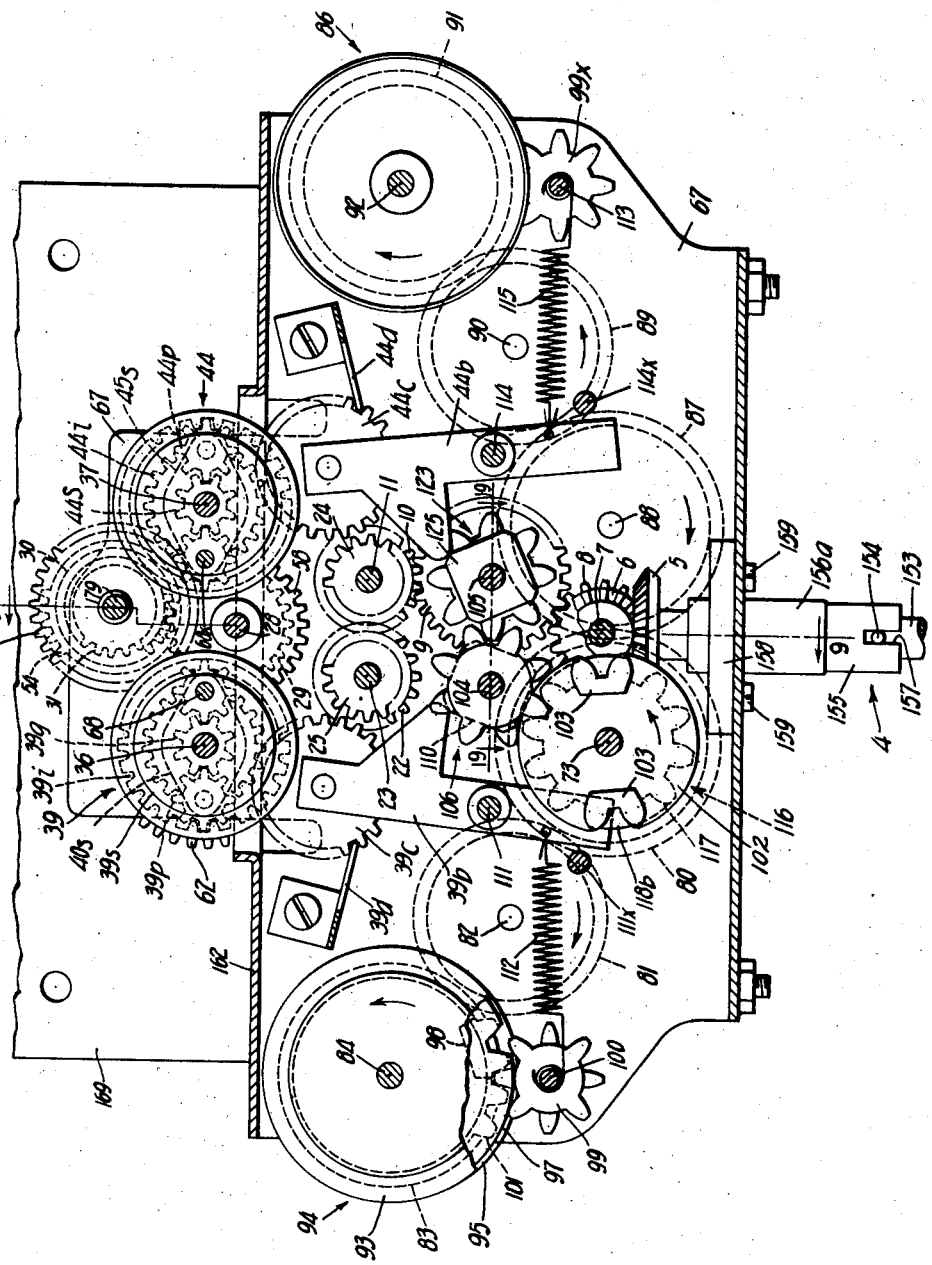
Figure 10 is a view in sectional elevation taken on the line 10—10 of Figure 9 looking in the direction of the arrows.
Figure 19:
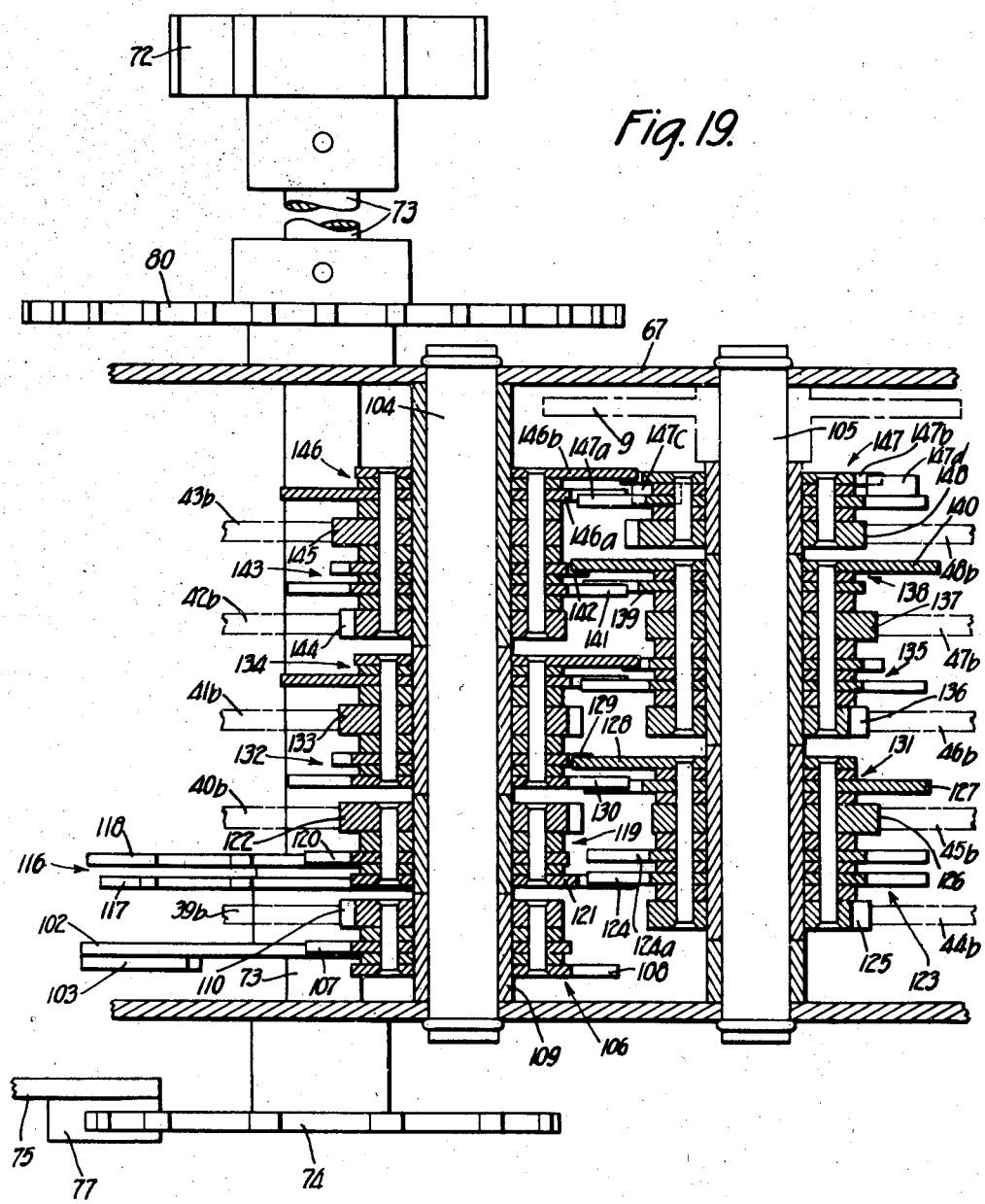
Figure 20:
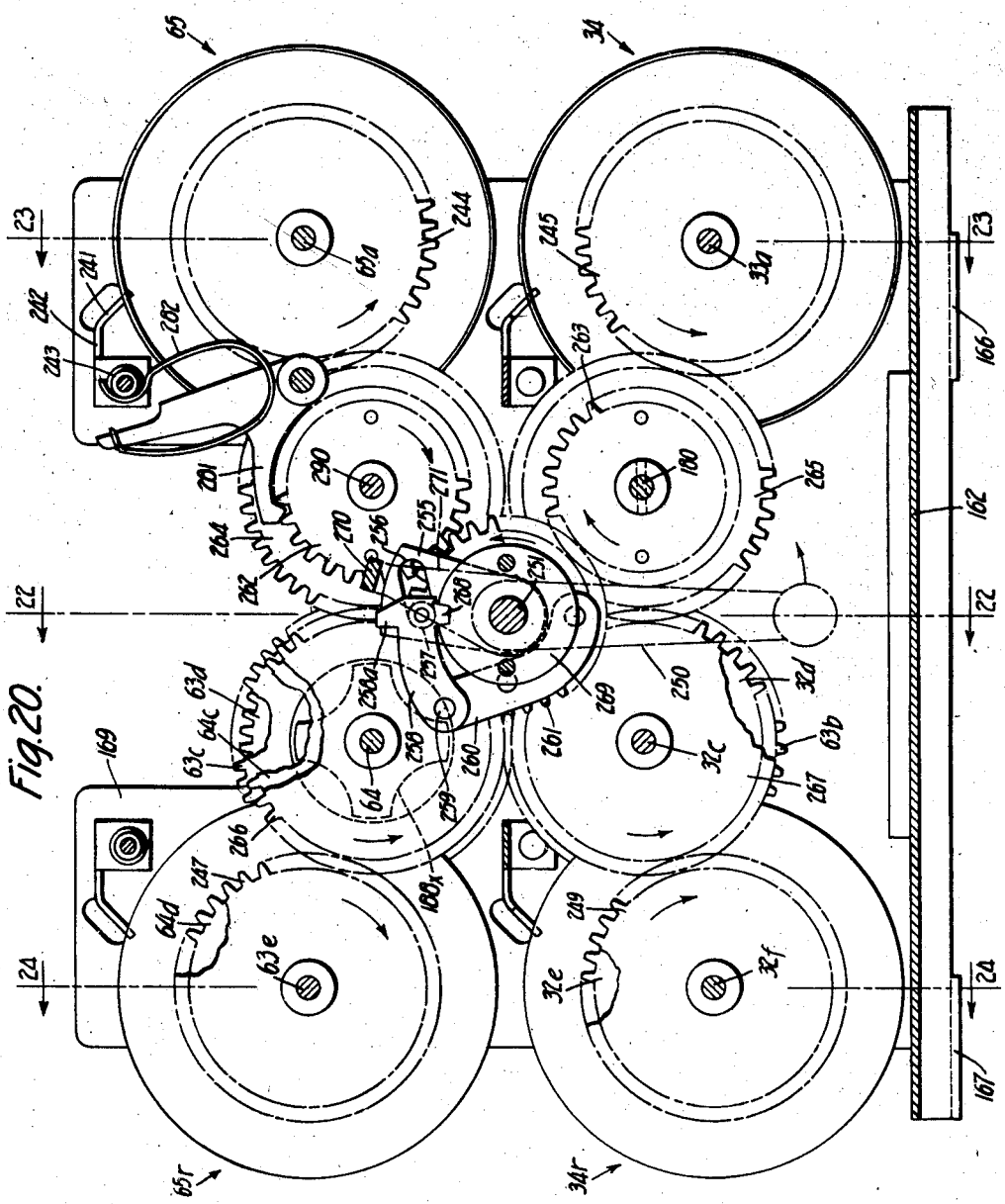
Figure 21:
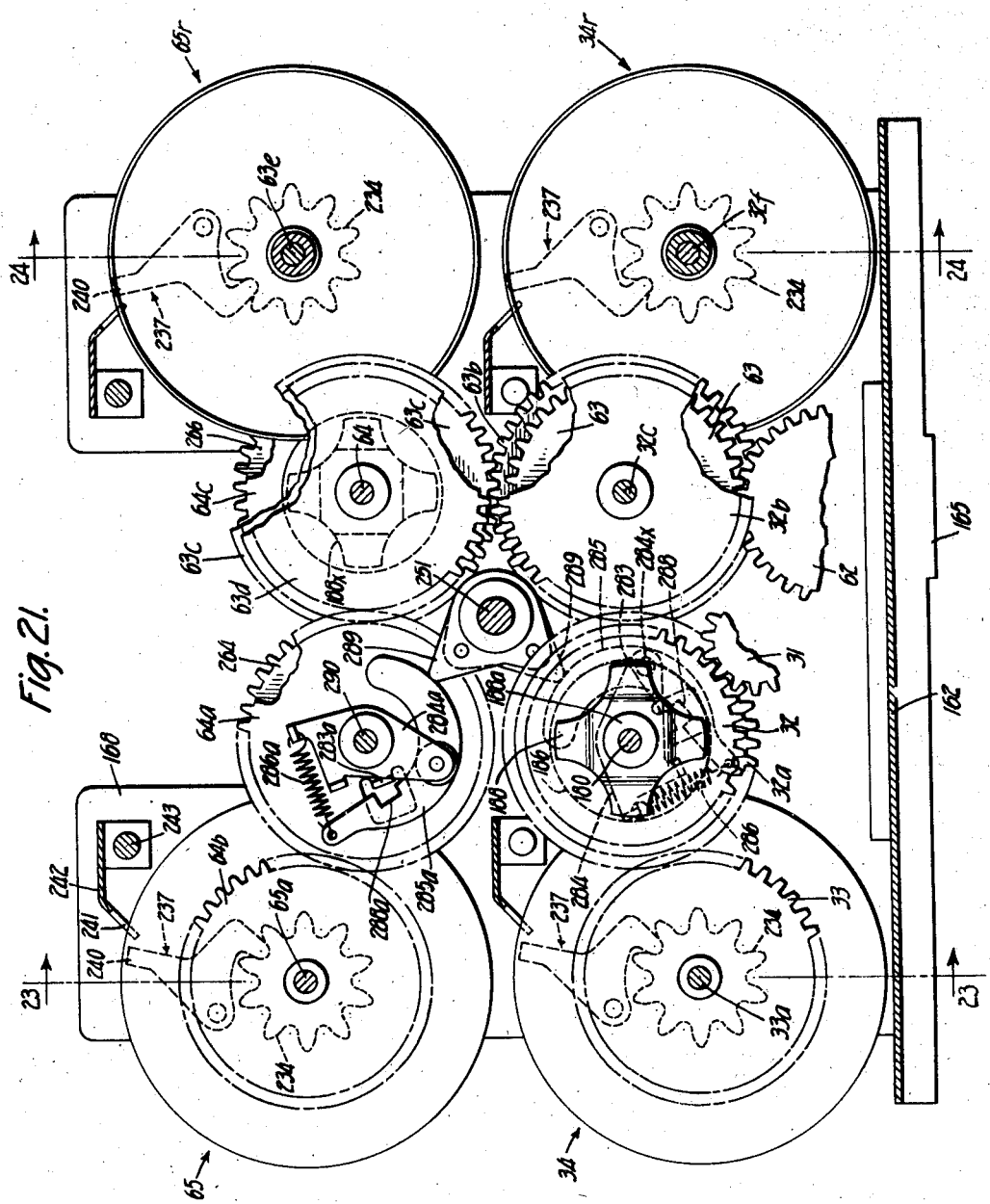
Figure 22:
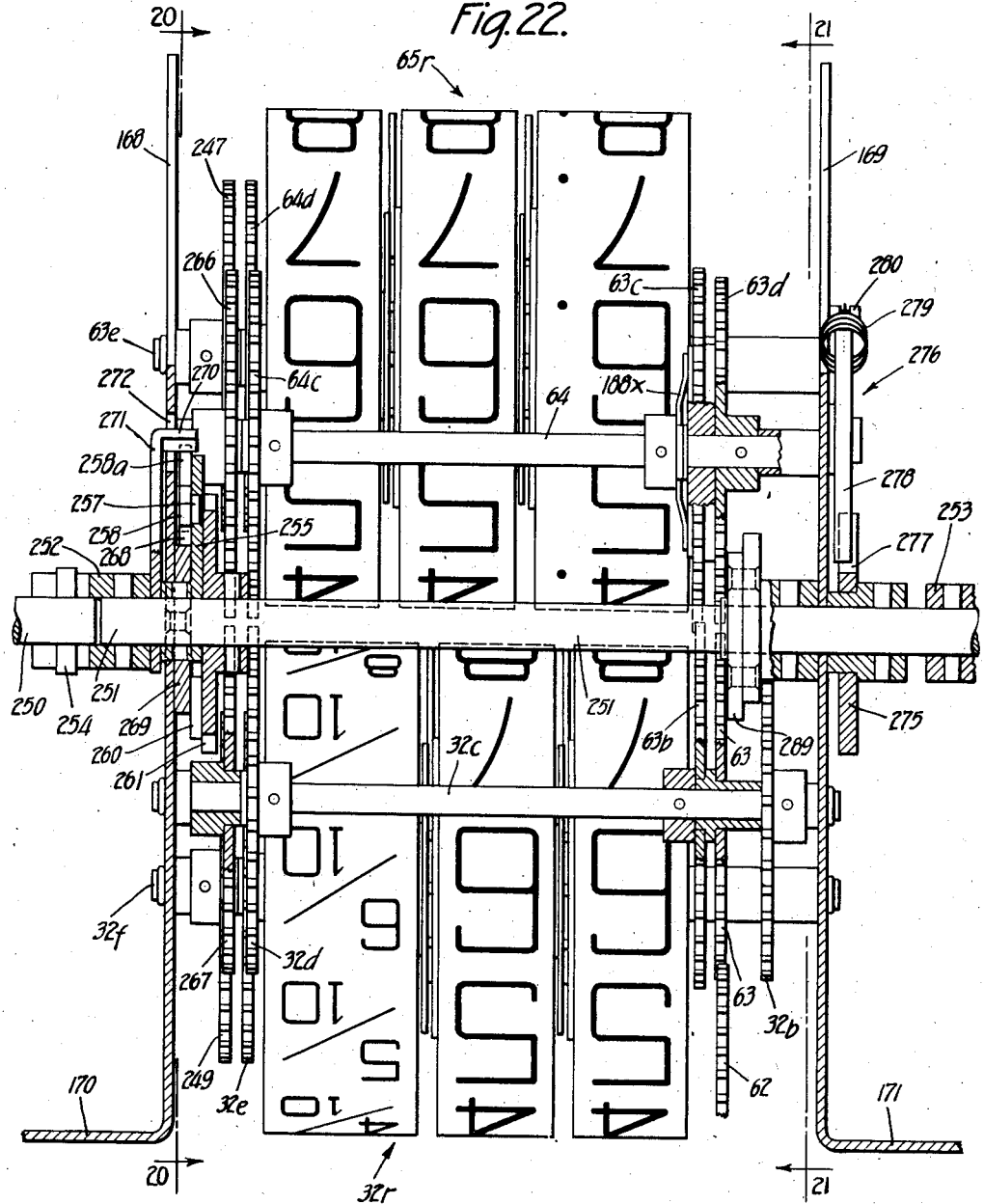
Figure 23:
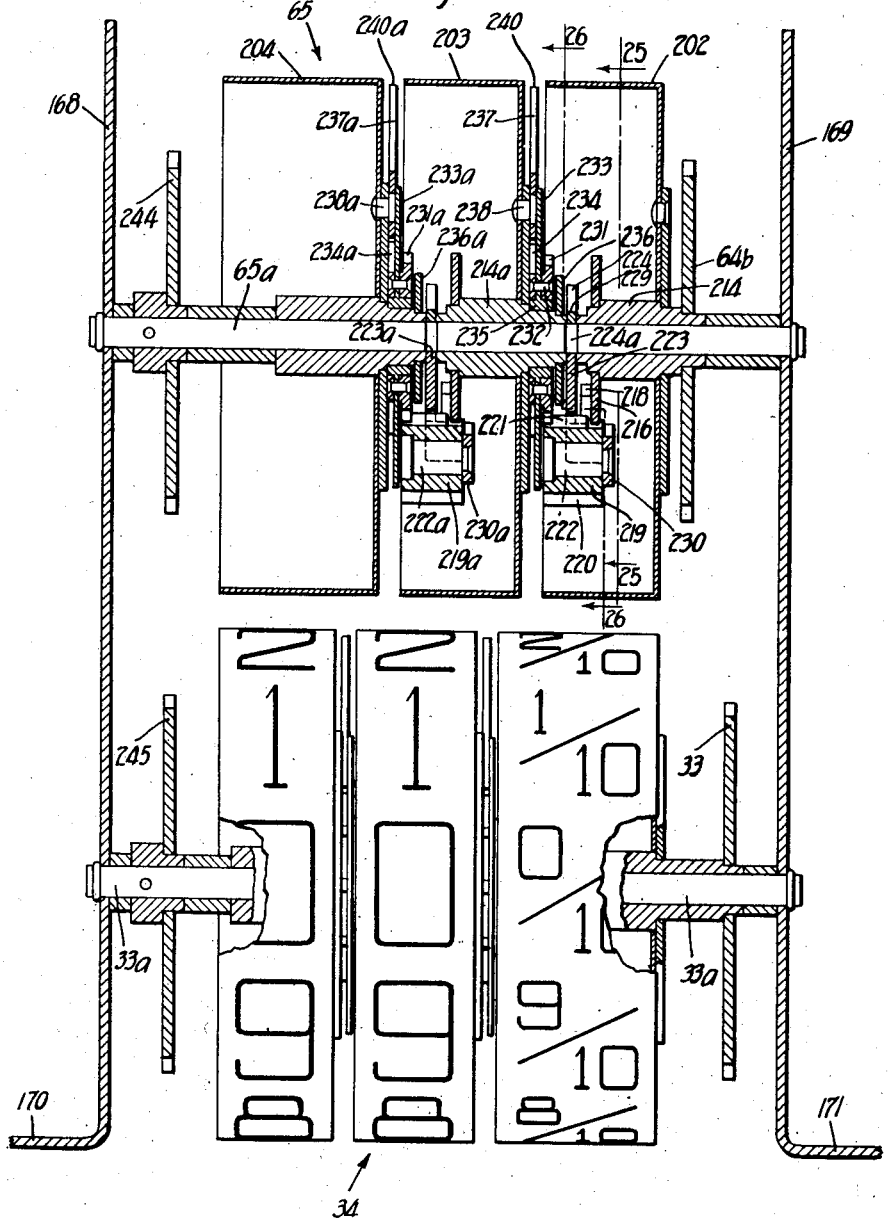
Figure 24:
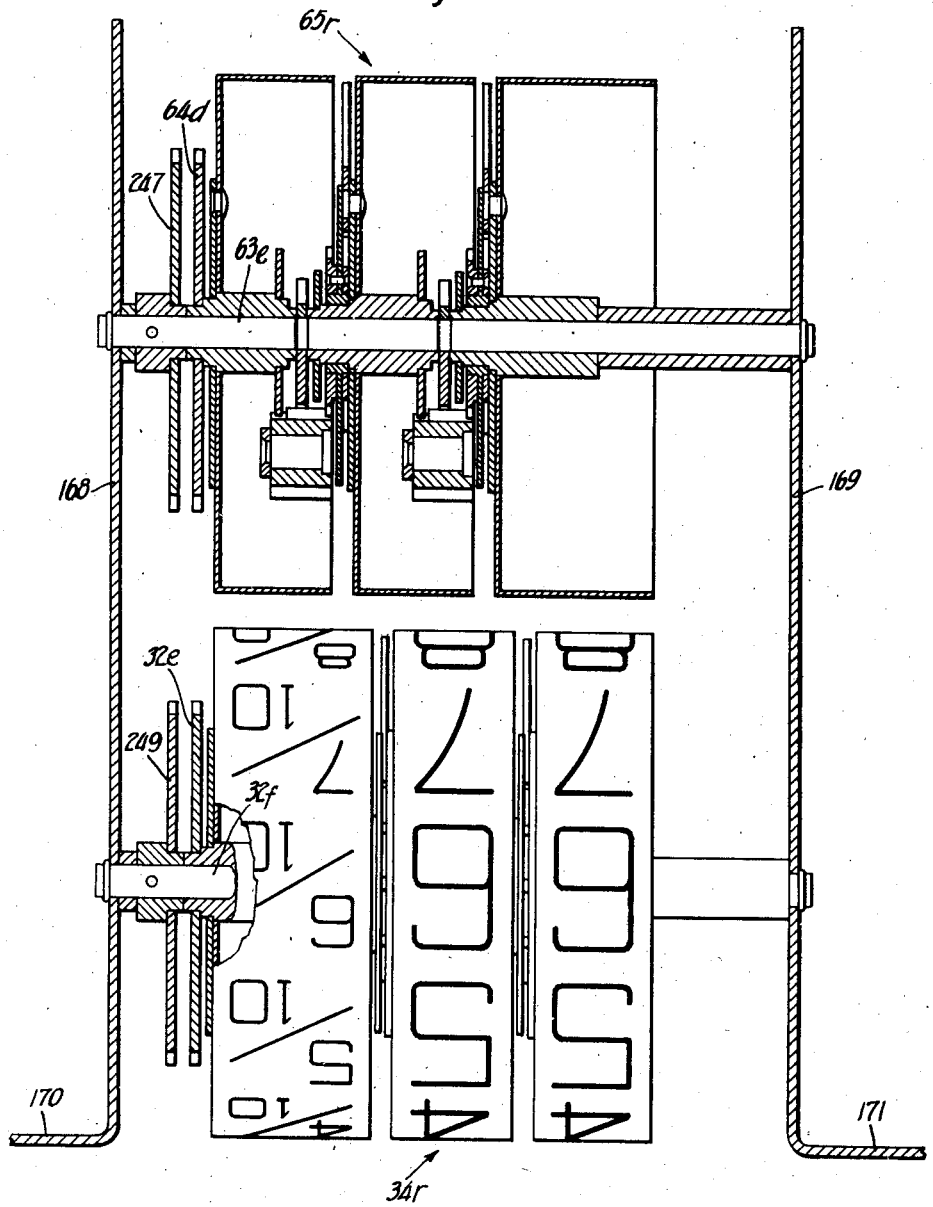
Figure 25:
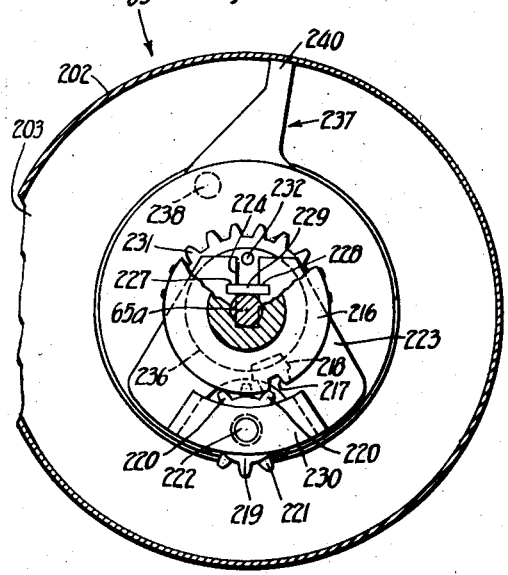
Figure 26:
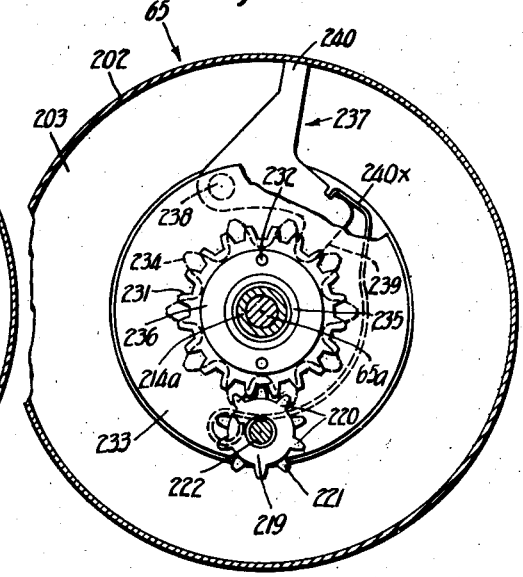
Figure 27:
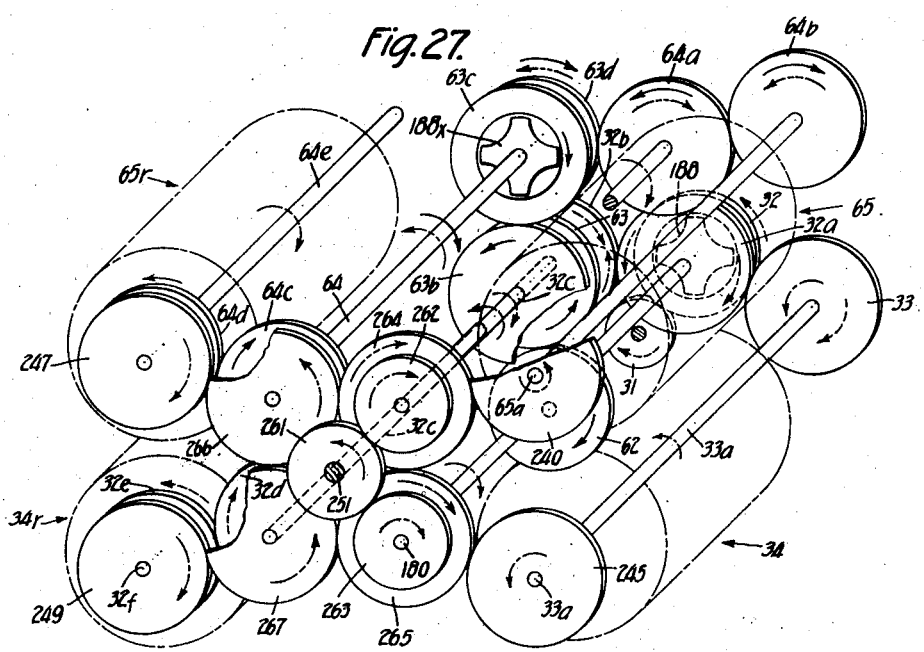

Figures 14 and 15 taken end to end at line A represent diagrammatically the multiplicand selecting mechanism;

Figure 16 shows the two elements of a Geneva member illustrated in Figures 14 and 15 disjoined from one another;

Figure 17 is a view similar to Figure 16 of two elements of another Geneva member disclosed in Figure 15;

Figure 18 is a detail view of a Geneva gear disclosed in Fig. 14, and employed for controlling the setting of all of the differentials other than the one of lowest value;

Figure 19 is a fragmentary sectional view taken on the line 19—19 of Figure 10 looking in the direction of the arrows;

Figure 20 is a view in sectional side elevation, taken on the line 20—20 of Fig. 22, of the upper unit of the apparatus as observed from the left-hand side of the unit;

Figure 21 is a sectional view similar to Figure 20 the upper unit being observed, taken on the line 21—21 of Fig. 22, and looking from the right-hand side thereof;

Figure 22 is a view of the upper unit in sectional elevation taken on the line 22—22 of Figure 20 and looking in the direction of the arrows;

Figure 23 is a view in sectional elevation of the upper unit, the section being taken on the lines 23—23 of Figures 20 and 21 and looking in the direction of the arrows;

Figure 24 is a view in sectional rear elevation, taken on the lines 24—24 of Figures 20 and 21, illustrating particularly the two rear registers of the upper unit, with parts broken away for clearness of illustration;

Figure 25 is a view in sectional side elevation through the front price register, the section being taken upon the line 25—25 of Figure 23 looking in the direction of the arrows, and parts being broken away for clearness of illustration;

Figure 26 is a sectional view taken on the line 26—26 of Figure 23 looking in the direction of the arrows; and Figure 27 is a perspective diagrammatic view illustrating diagrammatically the transmission and zero setting connections to the price and quantity registers.

Figure 1:
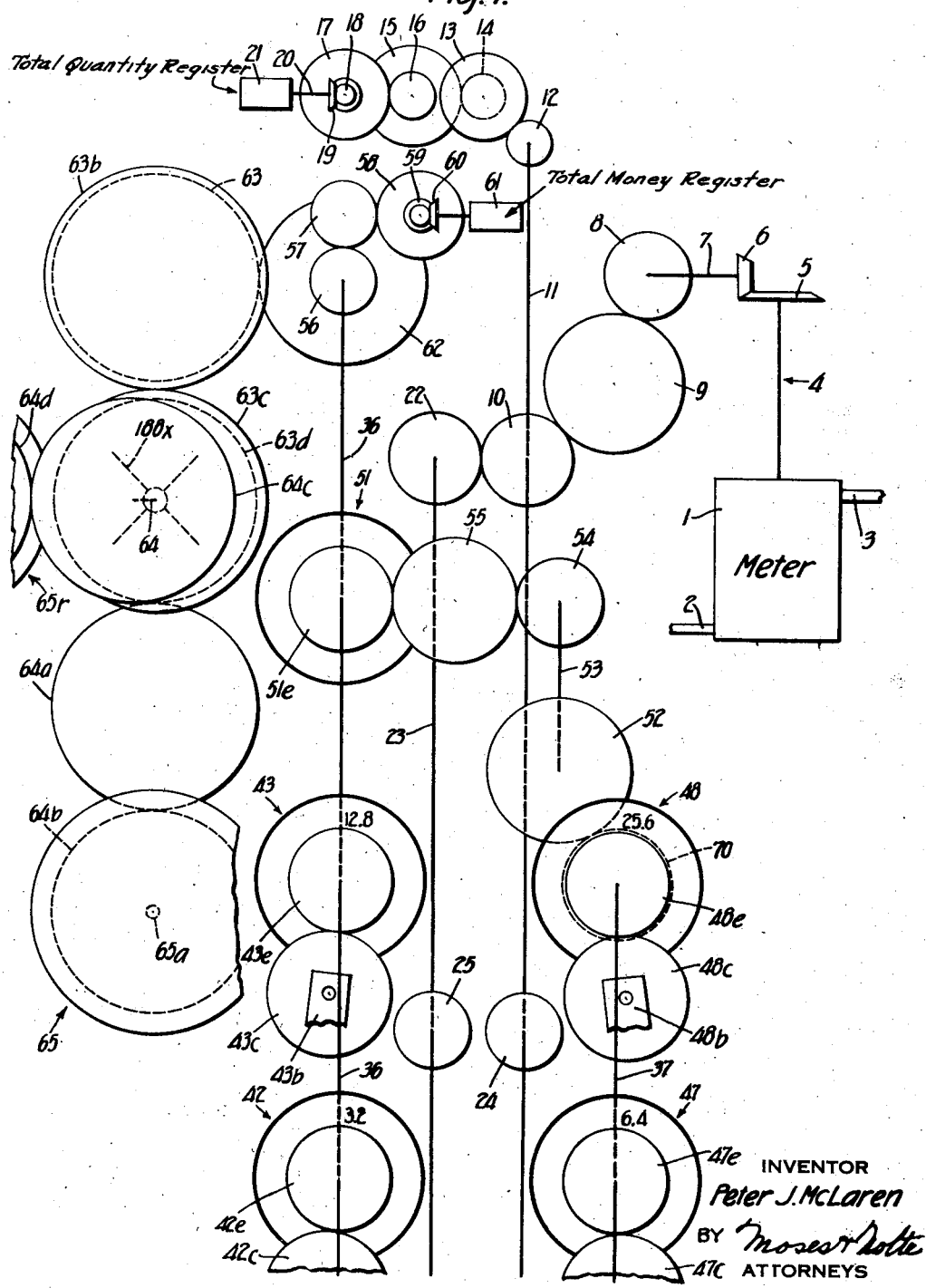
Figure 2:
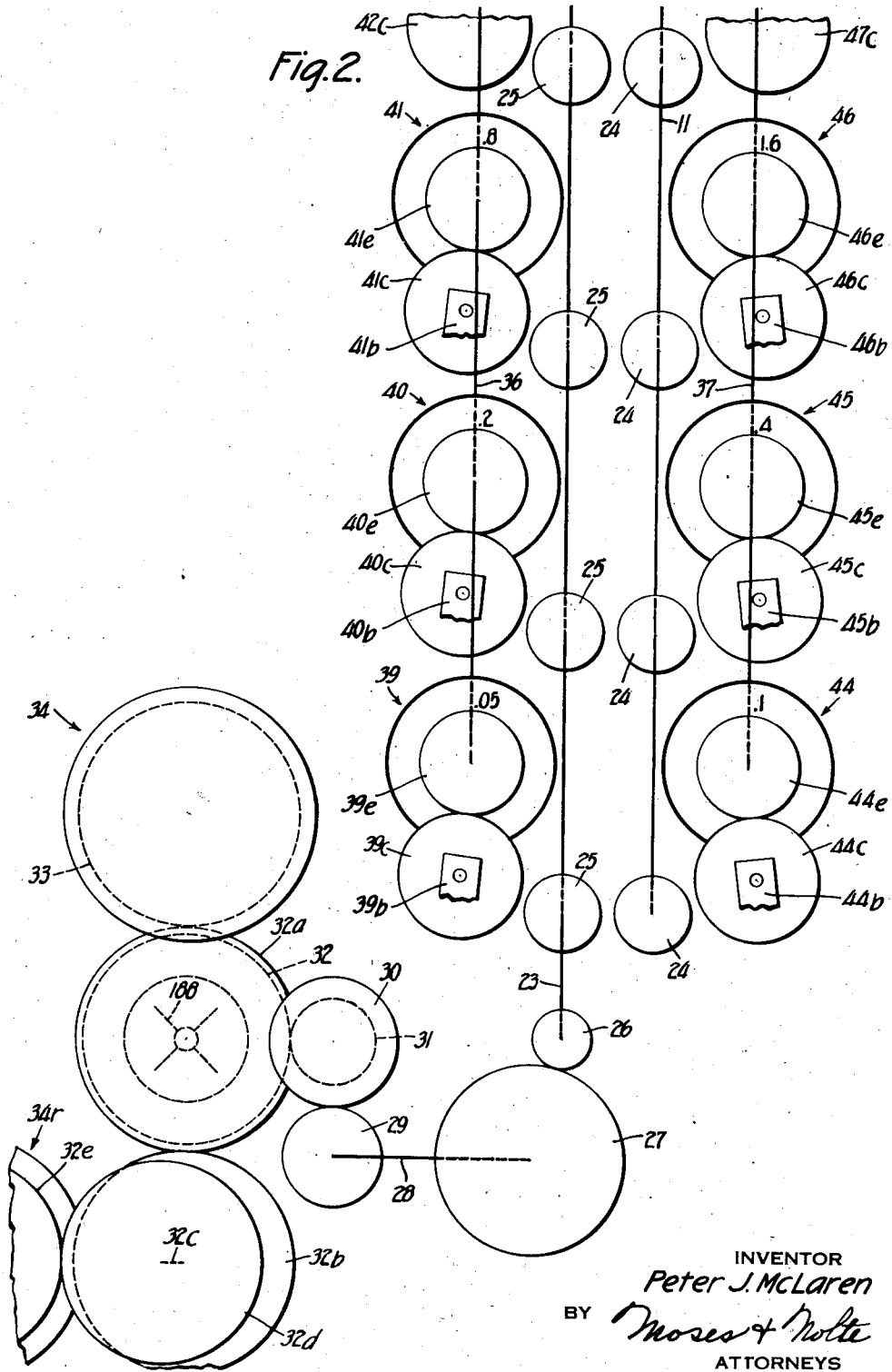

Figures 1 and 2 show diagrammatically the arrangement of the multiplying differentials and their drive, as well as the general broad scheme of the connections from the multiplier input member to the quantity registers and to the total quantity register. The connections to the sales price registers and to the total money register are also shown diagrammatically in these figures. The purpose of the views is primarily to illustrate the principle of multiplication, so that a clear understanding may be had of the kind of multiplicand setting mechanism required for making the desired multiplicands available in the order of their values. Figures 1 and 2, taken together, diagrammatically illustrate the two banks of differentials.

The metering chamber 1 of the gasoline pump (not shown) has an inlet 2 and an outlet 3, and includes means arranged to drive a rotary shaft 4 in proportion to the delivery of gasoline. The shaft 4 is connected through bevel gears 5 and 6, see also Figs. 3, 9 and 10, to drive a shaft 7. The shaft 7 acts through gears 8 and 9 to drive a gear 10 which is fast upon a shaft 11. The shaft 11 acts through gears 12, 13, 14, 15, 16, 17, 18 and 19, also shown in Fig. 11, to drive a shaft 20 which is directly connected to the wheel of lowest denomination of a total quantity register 21, this register being in the form of a decimal wheel counter of conventional and well known construction.

The gear 10 drives the gear 22 fast on a shaft 23. The shaft 11 and 23 have broad pinions 24 and 25 fast upon them, which extend continuously along the shafts. For the purpose of diagrammatic illustration, however, the broad pinion on the shaft 11 is indicated by the several discs or circles 24, in Figs. 1 and 2, and the broad pinion upon the shaft 23 is similarly indicated by the discs or circles 25.

The shaft 23 acts through a gear 26 to drive a gear 27 fast upon a shaft 28, Figs. 2, 3, 7 and 9. The shaft 28 also has fast upon it a gear 29 which, through gears 30, 31 and 32, drives a gear 33. The gear 32 frictionally drives a gear 32a, see Figs. 2, 6, 21 and 27, and the latter gear, in turn, drives the gear 33 which is free to rotate on a shaft 33a and is fast with the dial wheel of lowest denomination, see Fig. 23, of the front sales quantity register 34. The gear 32a also drives a gear 32b, Figs. 2, 21 and 22, fast on a shaft 32c. A gear 32d, which is also fast on shaft 32c, drives a gear 32e which is free to rotate on a shaft 32f, and is fast with the dial wheel of lowest denomination of the rear sales quantity register 34r. The registers 34 and 34r are in the form of decimal wheel counters generally like that disclosed in my pending application Serial No. 206,570. The number indicated by the registers 34 and 34r is the number of gallons of gasoline delivered to a customer at a particular sale, and this number is the number used as the multiplier for determining the sale price.

A series or bank of differentials, 39 to 43, is arranged upon a shaft 36 to be selectively driven from the broad pinion 25, Figs. 1, 2, 9, 10 and 13, and a second series or bank of differentials, 44 to 48, is arranged upon a stationary shaft 37 to be selectively driven from the broad pinion 24. The broad pinions are identical and are driven at equal speeds but in opposite directions by the rotation of the shaft 4.

Each of the differentials mounted upon the shaft 36 is adapted to be individually coupled to the broad pinion 25 to be driven by the broad pinion, and similarly each of the differentials mounted upon the shaft 37 is adapted to be individually coupled to the broad pinion 24 to be driven by the broad pinion 24.

Thus a cam-controlled, shiftable, connecting gear 39c is provided for coupling the differential 39 directly to the broad pinion 25 and for uncoupling it from the barrel pinion 25.

Similar coupling means are provided for each of the other differentials so that every differential is capable of being directly driven by itself, or in combination with any one or more of the other differentials, depending upon the particular instantaneous setting of the various coupling gears. As shown in Figures 1 and 2, all of the coupling gears, 39c to 48c, are ineffective, and hence none of the differentials is being driven. The multiplicand is therefore zero, and rotation of the broad pinions would not produce operation of any of the differentials.

The individual driving values of the several differentials on the shaft 36 is as follows: differential 39, .05, differential 40, .2, differential 41, .8, differential 42, 3.2, differential 43, 12.8.

The differentials on the shaft 37 have the following individual driving values: differential 44, .1, differential 45, .4, differential 46, 1.6, differential 47, 6.4, and differential 48, 25.6.

The relative values assigned to the several differentials as listed above are with reference to a common output through the shaft 36. All of the input differentials mounted on the shaft 36 feed into a spider 51s which is one input element of a differential 51, Figs. 1 and 13. All of the differentials on shaft 37 feed into a gear 52, and thence through a hollow shaft 53, Fig. 9, and gears 54 and 55 to another input element 51e of the differential 51.

The differential 51 drives the shaft 36. The arrangement is such that a given rotation of the output member of differential 43 will have just one-half the effect upon the shaft 36 as that which an equal rotation of the final output member of the differential 48 would have. Thus, although the two banks of differentials may be identical, and each differential of a bank may have a driving value four times as great as that of its predecessor in the bank, the values of the differentials of one bank may correspond to alternate terms of a geometric series, in which the multiplier is two, while the values of the individual differentials of the other bank may correspond to the other alternate terms of the same geometric series.

Figure 9:
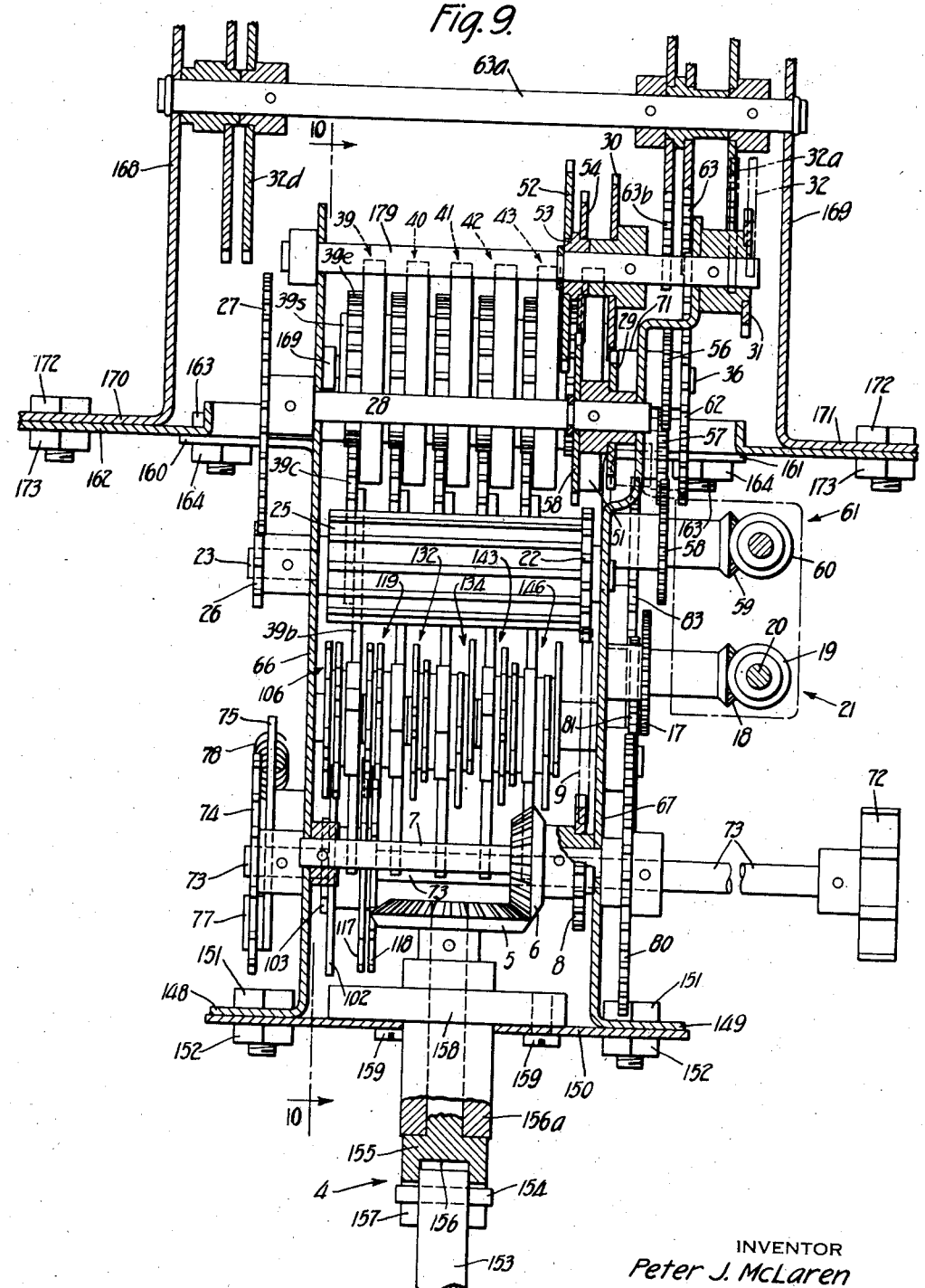
Figure 9 is a vertical sectional view taken substantially on the line 9—9 of Figure 10 looking in the direction of the arrows.
Figure 11:
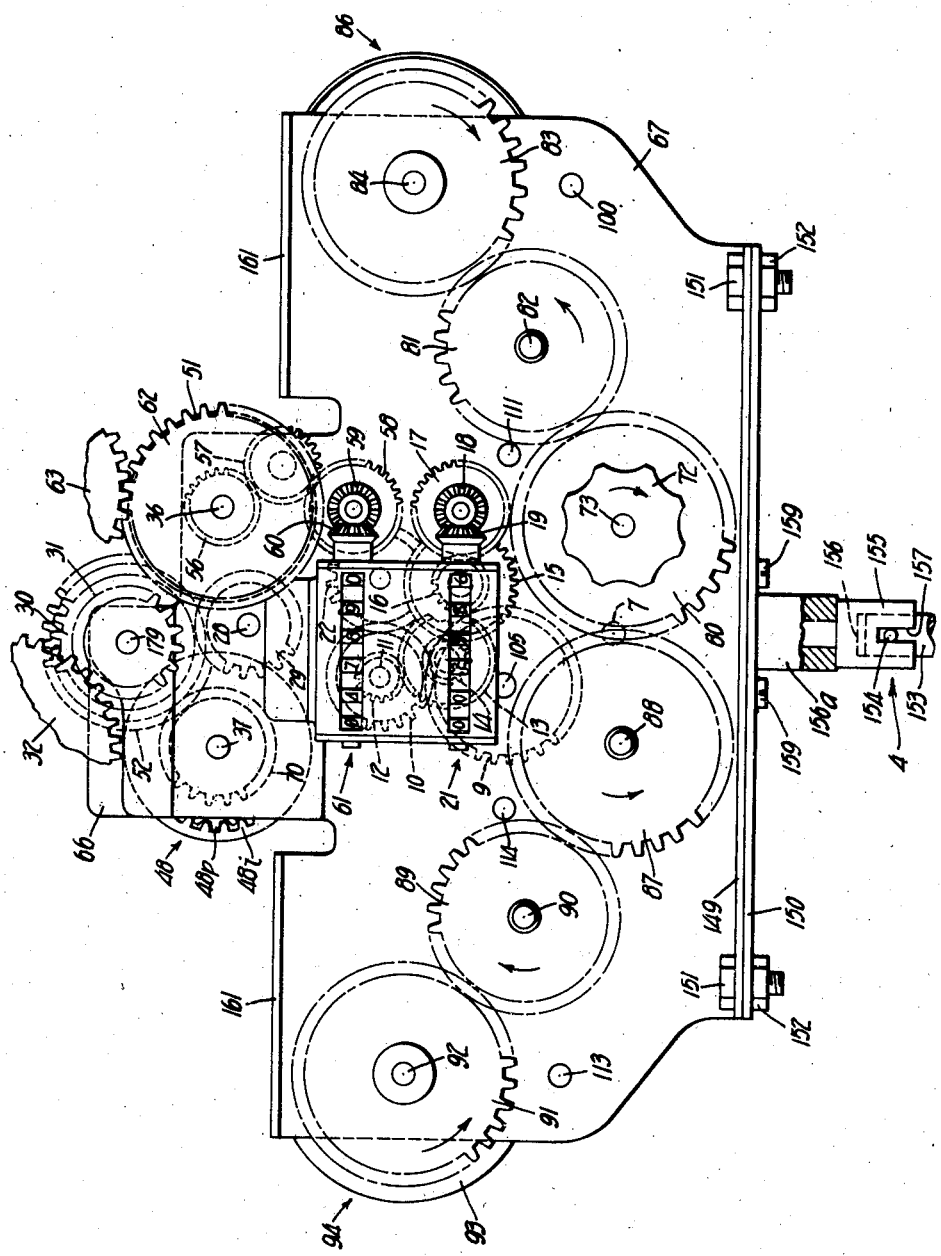
Figure 11 is a view in side elevation, partly broken away, of the lower unit of the apparatus as seen from the right-hand side.

The shaft 36 acts through gears 56, 57, 58, 59 and 60, Figs. 1, 9 and 11, to drive the units wheel of a total money register 61. This total money register may be on the form of a simple decimal counter of well known construction.

The shaft 36 also acts through gears 62, 63 and 63b, see Figs. 1, 20, 22 and 27, to drive a gear 63c mounted on a shaft 64. The gear 63c frictionally drives a gear 63d which is fast on the shaft 64. The gear 63d acts through a gear 64a, Fig. 21, to drive a gear 64b which is rotatable freely on a shaft 65a and is fast with the lowest denomination wheel of the front sale price register 65. A gear 64c, fast on a shaft 64, Figs. 20 and 22, drives a gear 64d which is free to rotate on a shaft 64e and is fast with the lowest denomination wheel of the rear sale price or money register 65r, Figs. 20 and 24.

The registers 21 and 61 are permanently connected to their respective input trains and are incapable of being driven backward or of being reset to zero. Zero setting mechanism is provided for setting all four of the registers 34, 34r, 65 and 65r back to zero simultaneously, however, as will hereinafter appear.

The arrangement of the differentials in two banks is well illustrated in Figures 12 and 13. The shafts 36 and 37 are mounted in frame plates 66 and 67. The differentials are all alike with the exception of slight variations in the end differentials of each bank. The differential 39 comprises a spider 39s having a sun gear 39g fast upon it. The spider 39s is freely mounted upon the shaft 36, but is locked against rotation by means of a pin 68 which it carries. The pin 68 fits into the bore of a hollow stud 69 affixed to the frame plate 66. The differential 39 also comprises an internally toothed gear 39i which has bearing upon a hub portion of the spider 39s. The gear 39i has a driving external gear 39e formed upon its hub portion for driven engagement with shiftable clutch gear 39c. The differential 39 also includes a pair of planetary pinions 39p which are carried by the spider 40s of differential 40, and which are constantly in mesh, both with the internal teeth of the sun gear 39i, and with the external teeth of the sun gear 39g.

The spider 44s of differential 44 is mounted and held against rotation in the same manner as the spider 39s of differential 39 through a pin 68x and a fixed stud 69x. The spiders of all of the other differentials are revoluble, however.

The differential 40 is a duplicate of the differential 39, save only that its spider is revoluble and carries the planetary pinions 39p of the differential 39. The same thing is true of the differentials 41, 42, 43, 45, 46 and 47.

The differential 48, Figs. 12 and 13, on the shaft 37 is also a duplicate of the differential 40, but the spider 70a which carries the planetary gears 48p is formed with a gear 70 for driving the gear 52, and thence through a hollow shaft 53, see Fig. 9 also, and gears 54 and 55, driving the external gear 51e of differential 51. The spider 51s of differential 51 carries the planetary gears 43p of differential 43, and also the sun gear 51g of differential 51. The differential 51 is just like the differential 40, but the spider 71 which carries the planetary gears 51p is made fast to the shaft 36. The shaft 36 is, therefore, a common output shaft for all of the differentials of both banks.

The various differentials 39 to 48 may be coupled individually to drive the shaft 36 through differential 51, or as many of them as desired may be coupled simultaneously to drive the shaft 36 so as to additively combine the effects of their individual input values. The mechanism for controlling the coupling of the individual differentials to the respective broad pinions 24, 25, Fig. 10, is the multiplicand setting mechanism. This mechanism will now be described.

Figure 3:
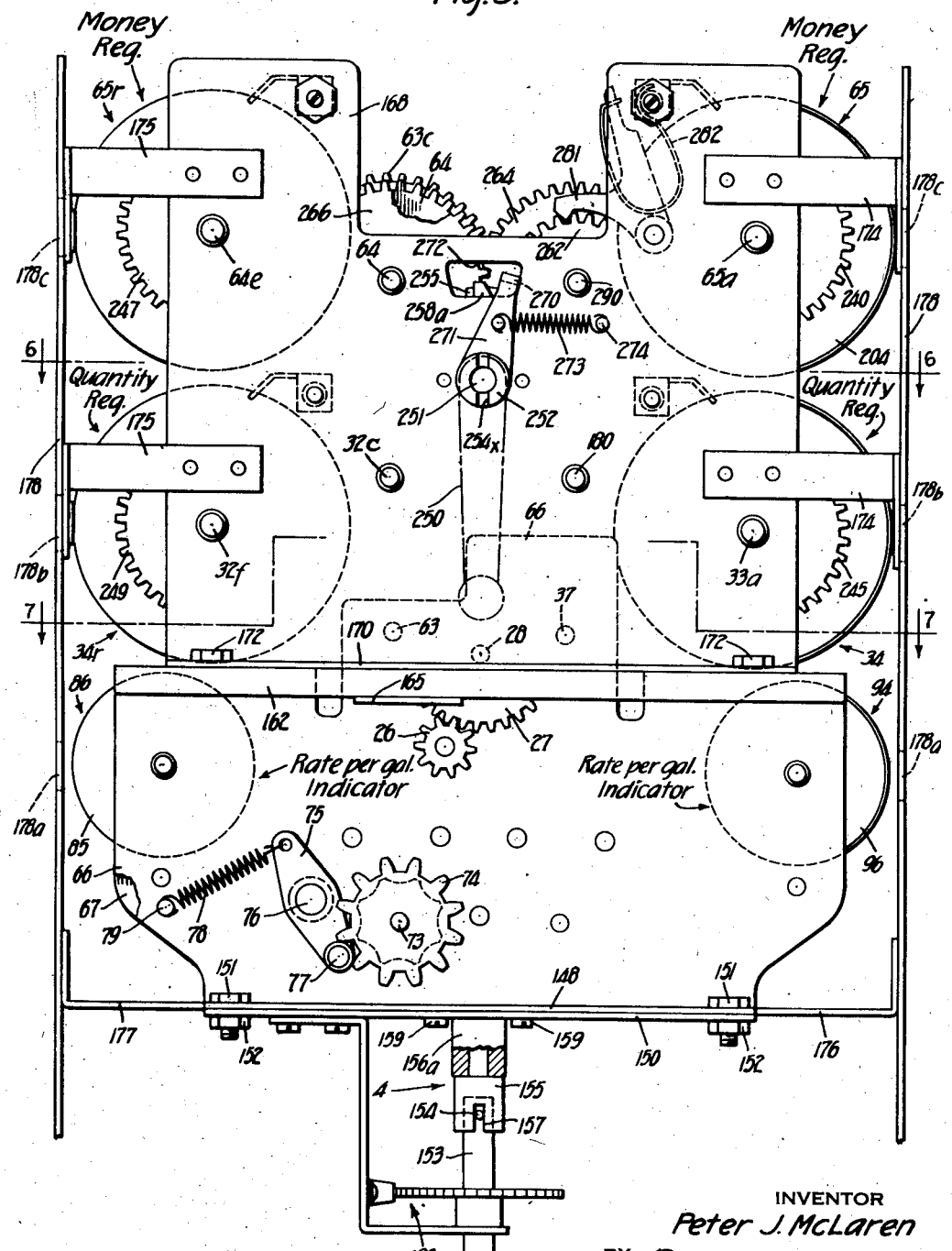
Figure 3 is a fragmentary view of the apparatus in side elevation as seen from the left of Fig. 5.

The multiplicand setting knob 72, Figs. 9, 11, 14 and 19, is made fast upon a shaft 73 which is journaled in the side plates 66 and 67. At the left-hand end of the shaft 73, to the left of the plate 66, in Fig. 9, the shaft has fast upon it a twelve-toothed detent gear 74, see Fig. 3 also, for causing a full revolution of the shaft to be divided into twelve equal steps or spaces. A detent lever 75, Figs. 3 and 9, is pivotally mounted upon a stud 76 carried by the frame plate 66. The lever 75 carries at its outer end a detent roller 77 for cooperating with the teeth of the detent gear 74. A spring 78, connected at one end to the tail of the lever 75 and at the opposite end to a pin 79 fixed on the plate 66, urges the roller yieldingly but forcibly into engagement with the periphery of the gear 74, so that the roller is effective to cause the advancing steps of the shaft 73 to be of equal length and also to oppose any shifting of the shaft from a set position.

The shaft 73 has fast upon it, at the right-hand side of the frame plate 67, see particularly Figs. 9, 11 and 19, a gear 80 for driving the multiplicand indicators. The gear 80 drives a gear 81 which is journaled upon a stud 82 fixed on the frame plate 67. The gear 81 in turn drives a gear 83 fast upon a shaft 84. The shaft 84 has also fast on it the lowest denomination wheel 85, of one of the multiplicand indicators 86 to drive it, see Fig. 7.

The gear 80, Fig. 11, also drives a gear 87 which is journaled upon a stub shaft 88, the stub shaft 88 being fixedly mounted upon the frame plate 67. The gear 87 drives a gear 89 which is journaled upon a stub shaft 90 affixed to the frame plate 67. Gear 89 drives a gear 91 which is fast upon a shaft 92. The shaft 92 is fast with the wheel 93 of lowest denomination of the second multiplicand indicator 94. It will be observed that, because only one gear is interposed between the gears 80 and 83, Fig. 11, rotation of the shaft 84 is in the same direction as rotation of the shaft 73. Since two gears are interposed between the gear 80 and the gear 91, rotation of the shaft 92 is in the opposite direction to that of the shaft 73. As a result of this arrangement each of the multiplicand indicators may be arranged to have the tops of its dial wheels travel toward an observer viewing the indicator as the multiplicand increases. In other words, clockwise rotation of the knob 72, as viewed in Figure 11, produces clockwise rotation of the shaft 84 and counterclockwise rotation of the shaft 92. Consequently, the two multiplicand indicators may be of identical construction and arrangement, the only difference being that the shaft 92 is connected to the lowest denomination wheel 93 of indicator 94, the wheel nearest to the gear 91, Fig. 7, whereas the shaft 84 is connected to the lowest denomination wheel 85 of the indicator 86, the wheel farthest from the gear 83.

Both the shafts 84 and 92 turn to the same extent as the shaft 73, and hence one complete rotation of the lowest denomination wheel of either counter is divided into twelve equal steps by the detent wheel 74 fast on the shaft 73, Fig. 3. The face of the wheel 93 is shown developed in Figure 8, and from an examination of this view it will be seen that this face has twelve equal divisions which are indexed, respectively, ⁰/₁₀, ¹/₁₀, ²/₁₀, ¹/₄, ³/₁₀, ⁴/₁₀, ¹/₂, ⁶/₁₀, ⁷/₁₀, ³/₄, ⁸/₁₀ and ⁹/₁₀, in the order stated.

A single step advance of the knob or finger wheel 72, Fig. 7, advances the wheel 93 one space to bring up the next number space of the wheel 93 opposite the sight opening of the indicator. The same thing is true of the identical wheel 85 of indicator 86.

Geneva mechanism is provided for carry-over purposes to advance the units wheel 95 one number space each time that the wheel 93 passes from ⁹/₁₀ to ⁰/₁₀, that is, at every twelfth step of the wheel 93. Geneva mechanism is also provided for carry-over purposes between the units wheel 95 and the tens wheel 96 of the indicator 94, but, in this instance, the carry-over occurs at every tenth step of the wheel 95. The wheels 95 and 96 are both simple decimal wheels having the numerals from 1 to 9 and zero arranged at equally spaced intervals on their faces.

The wheel 93 has fast with it a notched disc 97, Figs. 7 and 10, which carries a two-toothed lug 98, the space between the lug teeth coinciding with the notch of the disc. The disc and lug are arranged to cooperate with an eight-toothed pinion 99 which is revolubly mounted upon a transverse shaft 100. All eight of the teeth of the pinion 99 coact with a twenty-toothed gear 101 which is fast with the units wheel 95, and with the teeth of the lug 98, but alternate teeth are made short enough to escape engagement with the disc 97. The other alternate teeth of the pinion 99 coact with the disc 97. The circular peripheral portion of the disc normally engages two of the long teeth of the pinion 99 to lock the pinion against rotation, but when the lug 98 comes around the pinion is unlocked and is advanced two tooth spaces, that is, one-quarter of a turn. This in turn advances the gear 101 and the units wheel 95 of the indicator two tooth spaces or one-tenth of a turn. The carry-over from the units wheel to the tens wheel is of similar construction and includes a carry-over pinion (not shown).

The indicators 86 and 94, Fig. 7, are merely for showing the operator what setting has been attained by operation of the knob 72. The primary function of the knob 72 and the shaft 73 is to control the connections from the broad pinions 24 and 25 to the differentials 39 to 48, Figs. 1 and 2. The idea is to set up a new drive ratio between the input shaft 4 and the output shaft 36 for each step of advance of the knob 72, consistent with the order and amounts of the indications given by the indicators 86 and 94, Fig. 7.

The following chart will be useful for reference as indicating the sequence of connections required to be established in order to make the desired multiplicands effective in sequence, and for making clear the law of operation of the mechanism to be described.

|      | .05 | .10 | .20 | .40 | .80 | 1.60 | 3.20 | 6.40 | 12.80 | 25.60 |
|------|-----|-----|-----|-----|-----|------|------|------|-------|-------|
| 0    |     |     |     |     |     |      |      |      |       |       |
| .10  |     | x   |     |     |     |      |      |      |       |       |
| .20  |     |     | x   |     |     |      |      |      |       |       |
| .25  | x   |     | x   |     |     |      |      |      |       |       |
| .30  |     | x   | x   |     |     |      |      |      |       |       |
| .40  |     |     |     | x   |     |      |      |      |       |       |
| .50  |     | x   |     | x   |     |      |      |      |       |       |
| .60  |     |     | x   | x   |     |      |      |      |       |       |
| .70  |     | x   | x   | x   |     |      |      |      |       |       |
| .75  | x   | x   | x   | x   |     |      |      |      |       |       |
| .80  |     |     |     |     | x   |      |      |      |       |       |
| .90  |     | x   |     |     | x   |      |      |      |       |       |
| 1.00 |     |     | x   |     | x   |      |      |      |       |       |
| 1.10 |     | x   | x   |     | x   |      |      |      |       |       |
| 1.20 |     |     |     | x   | x   |      |      |      |       |       |
| 1.25 | x   |     |     | x   | x   |      |      |      |       |       |
| 1.30 |     | x   |     | x   | x   |      |      |      |       |       |
| 1.40 |     |     | x   | x   | x   |      |      |      |       |       |
| 1.50 |     | x   | x   | x   | x   |      |      |      |       |       |
| 1.60 |     |     |     |     |     | x    |      |      |       |       |
| 1.70 |     | x   |     |     |     | x    |      |      |       |       |
| 1.75 | x   | x   |     |     |     | x    |      |      |       |       |
| 1.80 |     |     | x   |     |     | x    |      |      |       |       |
| 1.90 |     | x   | x   |     |     | x    |      |      |       |       |
| 2.00 |     |     |     | x   |     | x    |      |      |       |       |
| 2.10 |     | x   |     | x   |     | x    |      |      |       |       |
| 2.20 |     |     | x   | x   |     | x    |      |      |       |       |
| 2.25 | x   |     | x   | x   |     | x    |      |      |       |       |

It will be observed upon inspection of the above chart that, if those multiplicands involving the fraction ¼ and the fraction ¾ were ignored, the .05 differential would never go into use. The .1 differential would be out and in at alternate operations. The .2 differential would be out for two, in for two, out for two, and so on. The .4 differential would be out for four, in for four, out for four, and so on. The .8 differential would be out for eight, in for eight, out for eight, and so on. The 1.6 differential would be out for sixteen, in for sixteen, out for sixteen, and so on. These examples sufficiently illustrate the general rule.

This regular rule of progression, however, is interfered with by the requirement that the fractions ¼ and ¾ be brought in in their proper turns. It is evident, of course, that when ¼ is to be involved in a multiplicand, the last previous setting .2 must be retained and the .05 differential thrown into operation. Thus there should be at that step a dwell in the control of the .2 setting including all differentials of higher value than .05, and an operation of the .05 differential. At the next step the .05 differential should be thrown out of action and the normal progression should be continued until the fraction ¾ is involved. Here again, the last preceding setting of .7 is retained and the .05 differential is thrown in for one step, after which the .05 differential is thrown out, and the regular rule of progression is resumed. These variations of the regular rule of progression are uniform and occur periodically.

The shaft 73 has fast upon it a disc 102, see particularly Figs. 10, 14 and 19, having notches formed in it at diametrically opposite points and equipped with two two-toothed lugs 103 whose tooth spaces coincide with the respective notches. The lugs 103 are so constructed as to the size and shape of their teeth and the space between the teeth as to be consistent with the dimensions of corresponding parts of a twelve-toothed gear having the external diameter of the disc 102. A series of cams is provided upon a stationary shaft 104, and a second series of generally similar cams is provided upon a stationary shaft 105. A composite gear 106 is mounted upon the shaft 104 for operating the cam which controls the connection and disconnection of the differential 39 with the broad pinion 25 through the connector gear 39c, Fig. 10. This unit comprises two four-toothed gears, 107 and 108, Fig. 14, fast upon a sleeve 109, and so arranged that the teeth of each gear bisect the notches of the other. The sleeve also has fast upon it a cam 110, which is of generally rectangular form, to provide four lows and four highs in alternation. The teeth of the gear 107 are disposed in the plane of the disc 102, but the teeth of the gear 108 are disposed in the plane of the lugs 103.

The disc 102, Fig. 14, normally coacts with two teeth of the gear 107, to lock the sleeve 109 against rotation. At every sixth step or half revolution, however, a leading tooth of one of the lugs 103 engages a tooth of the gear 108 at a time when the disc notch associated with that lug is in position to receive the adjacent tooth of gear 107. Thus, the shaft 109 is turned through one-eighth of a revolution and stopped, a low spot on the cam being now in the position formerly occupied by a high spot. At the next ensuing step of the shaft 73 the notch wall coacts with the tooth of gear 107 which it has received, to advance the sleeve 109 another eighth of a revolution. Since the high spots of the cam 110 are disposed at quadrangular intervals, and since the two steps combined constitute a quarter turn of the cam 110, it is evident that the two steps serve to carry a high spot of the cam to exactly the same position which was occupied by the preceding high spot of the cam before the two steps were initiated. It will be clear that the second step results in a re-locking of the sleeve 109.

With the described arrangement, starting from a zero setting of the indicators 86 and 94, Fig. 7, the cam 110 will occupy the position illustrated in Figure 14 when the indicators read %0, 1/16 and 1/16. At the third step, however, which causes the fraction wheels of the indicators to read 1/4, the cam will be given a one-eight turn, and this will carry the first high of the cam away from engagement with a gear shifting lever 39b, Figs. 10 and 14, and move a low spot of the cam opposite the lever. At the next step which causes the fraction wheels to read 1/16, the cam will be given another eighth of a turn to bring the second high into the same relation to the lever 39b as that in which the first high is illustrated in Figure 14. After that, each step which brings up 1/4 or 3/4 on the indicator will be effective to carry a low spot of the cam opposite the lever 39b, while each step which carries 1/4 or 3/4 out of view on the indicators will be effective to bring a high spot of the cam into cooperative engagement with the lever 39b.

The lever 39b is one of a series of identical levers each individually associated with one of the multiplying differentials such as 39. The other similar levers have accordingly been given the numbers of their associated differentials with the subscript "b" added in each instance.

The levers 39b to 43b, inclusive, are pivotally mounted upon a transversely extending shaft 111, Fig. 10, and each has its tail connected through a spring 112 to the shaft 100 of the multiplicand indicator 94.

Each lever carries at its upper end one of the connecting pinions as, for example, the lever 39b carries the pinion 39c. The spring 112 urges the lever in a direction to carry the gear 39c into engagement with the broad pinion 25. The high points of the associated cam 110 serve to force the lever against the tension of the spring 112 in a direction to carry the connector gear 39c out of engagement with the broad pinion 25. The levers for carrying the connector pinions 44c to 48c, inclusive, are mounted upon a transversely extending shaft 114 and have their tails connected through springs 115 with the shaft 113 of the multiplicand indicator 86. It is thought that the construction, arrangement and operation of these levers will be clear from what has been said concerning the levers mounted on shaft 111 and particularly concerning the lever 39b and its associated parts.

A stop rod 111x, Fig. 10, is provided to limit the movement of the levers 39b to 43b by the action of springs 112 so as to prevent pressure of the gears 39c to 43c against the broad pinion 25 in their connected position. A similar stop rod 114x is provided for the levers 44b to 48b.

A detent spring 39d is mounted to engage the gear 39c as the gear moves out of engagement with the associated broad pinion. The detent 39d, Fig. 10, locks the disengaged gear against rotation. Since the gears 39c and 39e remain engaged, this locks the gear 39e of differential 39 against rotation, barring it as a possible outlet for rotation put in through other differentials. Similar detent springs 40d–48d are provided for the gears 40c–48c, respectively.

The lever shifting cams for all of the differentials other than differential 39 are operated and controlled from a composite gear 116 which is fast upon the shaft 73. This composite gear consists of two discs 117 and 118, Figs. 10, 14 and 19, both fast upon the shaft 73. The disc 117 has teeth constructed, arranged and disposed like the teeth of a twelve-toothed gear of corresponding diameter. A tooth is omitted at one side leaving a gap or space 117a, Fig. 14, and at the opposite side a solid segment 117b is present, the segment taking the place of three connecting teeth. The other gear member 118 is like the gear member 117, and is provided with a gap 118a and a solid segment 118b. The segment 118b extends across the gap 117a of the gear member 117 and covers the two teeth of disc 117 which border the gap 117a. The segment 117b similarly extends across the gap 118a and covers the two teeth of disc 118 which border the gap 118a.

The composite gear 116 cooperates with a composite gear 119 which is revolubly mounted upon the shaft 104. The composite gear 119 consists of two four-toothed gears 120 and 121 similar to the gears 107 and 108 which have already been described. The teeth of gear 120 are adapted to engage the teeth of gear 118 or be locked against operation by engagement with the solid segment 118b of the gear 118. The teeth of the gear 121, on the other hand, are adapted to engage the teeth of the gear 117 or to be locked against operation by engagement with the solid segment 117b, Fig. 14.

The composite gear 119 has fast with it a cam 122 for coacting with the shifting lever 40b, Fig. 19, associated with the differential 40. The parts are illustrated in their zero positions in Figures 14 and 19. The composite gear 119 drives a composite gear 123 which is revolubly mounted upon shaft 105. The composite gear 123 consists of two juxtaposed full eight-toothed gears 124 and 124a, the former in the plane of the gear 121 and the latter in the plane of the gear 120. The drive from composite gear 119 to composite gear 123 is simply the normal one to one drive which would occur from one eight-toothed gear to another. The two composite gears, therefore, operate at the same speed but in opposite directions. The composite gear 123 has fast with it a rectangular cam 125 for coacting with the shifting lever 44b which controls differential 44. It also has fast with it a sector cam 126 for coacting with shifting lever 45b which controls the differential 45. It will be observed that the cams 122, 125 and 126 are always operated in unison and to the same angular extent at any given operation.

Disregarding for the moment the irregularity of the drive introduced by peculiarities of the composite gear 116, and considering only the effect of successive steps of the gears 119 and 123 each corresponding to one-eighth of a revolution, it will be observed that each step either replaces a high of cam 125 by a low of the cam, or vice versa, so that the lever 44b is shifted to connect and disconnect the .1 differential 44 with its associated barrel pinion at alternate steps. The cam 122, however, which controls the .2 differential is constructed to hold the lever 40b in disengaging position for two successive steps, and then in engaging position for two successive steps, this sequence being maintained indefinitely. The cam 126 which coacts with the lever 45b for controlling the .4 differential holds the lever disengaged for four successive steps and then permits it to swing to and remain in engaging position for four successive steps, this sequence being maintained indefinitely.

Starting with the zero position, which is the position illustrated in Fig. 23, the first step of the shaft 73, Fig. 14, will turn the gears 119 and 123 a step, throwing the differential 44, Fig. 13, into action, but retaining the differentials 40 and 45 out of action. The second step will throw the differential 44 out of action and the differential 40 into action, the differential 45 will still be retained inactive. The third step, which changes the multiplicand from 2/10 to 1/4 does not operate the gears 119 and 123, and hence, so far as those gears are concerned, it is a lost step. A solid segment 118a of the gear 118 locks the gear 119 against operation during this dwell step. This is the very step, however, at which cam unit 106 is given its first advancing step to throw the differential 39, Fig. 13, into action. At the next step which brings up the multiplicand 1/6, the cam unit 106 is advanced another step, and the gears 119 and 123 are also advanced a step. Thus the .05 differential is thrown out of action, the .2 differential is maintained effective, and the .1 differential is again made effective. In other words, the sequence of operations of the cams 122, 125 and 126 is resumed just as if there has been no interruption. Such an interruption will occur, however, at each sixth step of the shaft 73, concurrently with an operation of the normally locked gear unit 106, and then at the following step the gear unit 106 will again be operated and locked, and the normal sequence of the cams 122, 125 and 126 will be resumed.

In addition to the cams 125 and 126, the composite gear unit 123 has fast with it two disc segments 127 and 128 which are disposed to overlap one another to substantially the extent of the space between two adjacent teeth of an eight-toothed gear like the gear 124. These discs are arranged in different planes to coact, respectively, with the teeth of the composite gear 132 formed by the four-toothed gears 130 and 129 mounted on the shaft 104. The disc segments 127 and 128 constitute a Geneva driving unit 131 for the composite gear 132 formed by the gears 129 and 130. The discs alternately lock and drive the composite gear 132. As illustrated in Figure 14, the disc 127 will turn three steps without affecting the gear unit 132, but at the fourth step it will engage the nearest tooth of the gear 130 and advance it one tooth space. Such advance will cause the next following tooth of the gear 129 to come into engagement with the trailing face of the disc 128. At the same time it will cause the circular periphery of the disc 127 to go into locking relation to two teeth of the gear 130. Four steps later the same kind of action will occur, but this time it will be a leading edge of the disc 128 which engages a tooth of the gear 129 to effect a single space advance of the composite gear 132.

The composite gear 132, Fig. 14, has fast with it a cam 133 for coacting with the shifting lever 41b that controls the .8 differential 41, Fig. 13. The cam 133 is of the same design as the cam 122 which controls the .2 differential 40. It is evident, therefore, that any given setting of the lever 41b will be maintained just four times as long as will a given setting of the lever 40b. In other words, whereas the lever 40b is in and out of operation for alternate periods of two steps of the composite gear 119, the lever 41b will be in and out of operation for alternate periods of eight steps of the gear 119.

From what has thus far been said, it is thought that the principle of operation which should govern the various differential controlling levers has been made clear, and hence the further description of these parts will be confined to a description of how the illustrated train is constructed and what it actually does.

The composite gear 132 also has fast with it a two-disc Geneva driving unit 134 like the unit 131 which has been described. This unit comprises a composite gear 135 which is like the composite gear 132, but which is mounted upon the shaft 105. The composite gear 135 has fast with it a cam 136 which is the same in construction as the cam 125. This cam operates the lever 46b which controls the 1.6 differential 46, Fig. 13. The described driving train to the cam causes it to be advanced one step of one-eighth of a revolution at each sixteenth step of the cam 125, Fig. 14.

The composite gear 135, Fig. 14, also has fast with it cam 137, Fig. 15, which is like the cam 126. This cam controls the lever 47b, which in turn controls the 6.4 differential 47, Fig. 13. It is evident that the lever 47b will be operated at every fourth operation of the lever 46b, and hence at every sixty-fourth step of the gear 119.

The composite gear 135, Fig. 14, also has fast with it a Geneva driving unit 138 composed of two discs 139 and 140, Figs. 15 and 16. Each disc is complete in two opposite quadrants and is cut away in two opposite quadrants, the terminals of the quadrants being the same in shape as the terminals of the sectors of the discs which compose the unit 131. These sectors cooperate with two four-toothed gears 141 and 142 of a composite gear 143 which is mounted upon the shaft 104. Instead of advancing the composite gear a single step at every fourth step, as the driving unit 131 advances the composite gear 132, the unit 138 advances the composite gear 143 one-eighth of a revolution at each alternate step of the driving unit. The composite gear 143 has fast with it a cam 144 which is identical with the cam 125, Fig. 14, that is, it has four lifts to a revolution as against one lift to a revolution of the cam 137, Fig. 15. If, therefore, the two cams were operated in unison, the lever 42b which is controlled by the cam 144, and which in turn controls the 3.2 differential 42, would be operated four times as fast as the lever 47b. Since the cam 144 is only actuated, however, at alternate operations of the cam 137, the lever 42b is actuated twice for each actuation of the lever 47b. Since the lever 47b is actuated at every sixty-fourth operation of the gear 119, the lever 42b is actuated at every thirty-second actuation of the gear 119. Another way of determining the action of the cam 144 is to note that the gear 132 is advanced a step at every fourth step of the gear 119, the gear 135 is advanced a step at every fourth step of the gear 132, and the gear 143 is advanced a step at every alternate step of the gear 135, or at every thirty-second step of the gear 119. Every step of the gear 143 shifts the lever 42b either from connecting to disconnecting position, or vice versa.

The gear 143, Fig. 15, has fast with it a cam 145 which shifts the lever 43b from connecting to disconnecting position after four steps of the gear 143 and from disconnecting to connecting position after the four following steps. The lever 43b controls the 12.8 differential 43, Fig. 13.

The gear 143 also has fast with it a two-disc Geneva driving unit 146 which is identical with the unit 131, Fig. 14, since it is composed of discs 146a and 146b. The unit 146, Fig. 15, drives a composite gear 147 mounted on the shaft 105, which gear is identical with the composite gear 132, Fig. 14, the composite gear comprising gear members 147a and 147b. The unit 146 advances the composite gear 147 one-eighth of a revolution at every fourth step of the unit 146, and hence at every 128th step of the gear 119. The composite gear 147 has fast with it a cam 148 which is identical with the cam 122, Fig. 14. The cam is effective, therefore, to actuate the lever 48b, Fig. 15, at alternate steps of the gear 147, that is to say, at each 256th step of the gear 119. The lever 48b controls the differential 48, Fig. 13, which is the 25.6 differential.

It will be evident from the description given that the entire train of mechanism from the gear 120, Fig. 15, through the gear 147 constitutes a system such that a continuous series of multiplicands, each differing from its predecessor by 1/16, would be caused to come up in regular sequence in response to step-by-step rotation of the gear 119. The gear 117, however, causes a dwell of this train at every sixth step of the control shaft 73, while the gear 192 causes the .05 differential to be thrown into action concurrently with the occurrence of each dwell. The entire mechanism is, therefore, adapted to produce a sequence of operations consistent with the table of multiplicands which are to be made available.

Provision is made to prevent forward rotation of the setting knob 72 beyond the maximum value represented by the cam setting mechanism, and also to prevent reverse rotation of said knob beyond the zero position of said cam setting mechanism. To this end, stop pins 147c and 147d, Figs. 15 and 19, are secured to the gear members 147b and 147a, respectively, the pin 147c being adapted to engage the periphery of the disc 146a if an attempt is made to rotate the composite gear 147 in a reverse or clockwise direction from its zero position in Fig. 15. Similarly the stop 147d is adapted to engage the periphery of the disc 146b when the cam setting mechanism reaches its maximum value. This is effected by rotating the composite gear forwardly or in a counter-clockwise direction in Fig. 15.

The described train from the gear 119, Fig. 14, to the gear 147, Fig. 15, together with the cams of that train, constitutes a simplified system as compared with the disclosure of my pending application Serial No. 160,052. All of the parts are mounted on the two shafts 104 and 105. The Geneva gearing may all consist of simple, stamped parts. Only three types of cam are required and none of these has more than four lifts to a revolution.

As already pointed out, the entire output of the differentials goes to a pair of gears 56 and 62, Figs. 1 and 13, the former of which feeds into the total money register, and the latter into the sales price registers. The gear 62, Figs. 10 and 11, forms a part of the lower unit of the machine, which includes the multiplicand indicators 86 and 94, the multiplicand controlling mechanism which has been described, the differentials, and the operating means for differentials; also the total money and quantity registers. The gear 63, Fig. 21, forms an element of an upper unit and is adapted to be placed in mesh with the gear 62 by juxtaposition of the upper and lower units.

Similarly, the gear 31, Fig. 11, which operates the quantity register forms a part of the lower unit, while the gear 32, Fig. 21, forms a part of the upper unit and is adapted to be placed in mesh with the gear 31 by the juxtaposition of the units.

Figure 4:
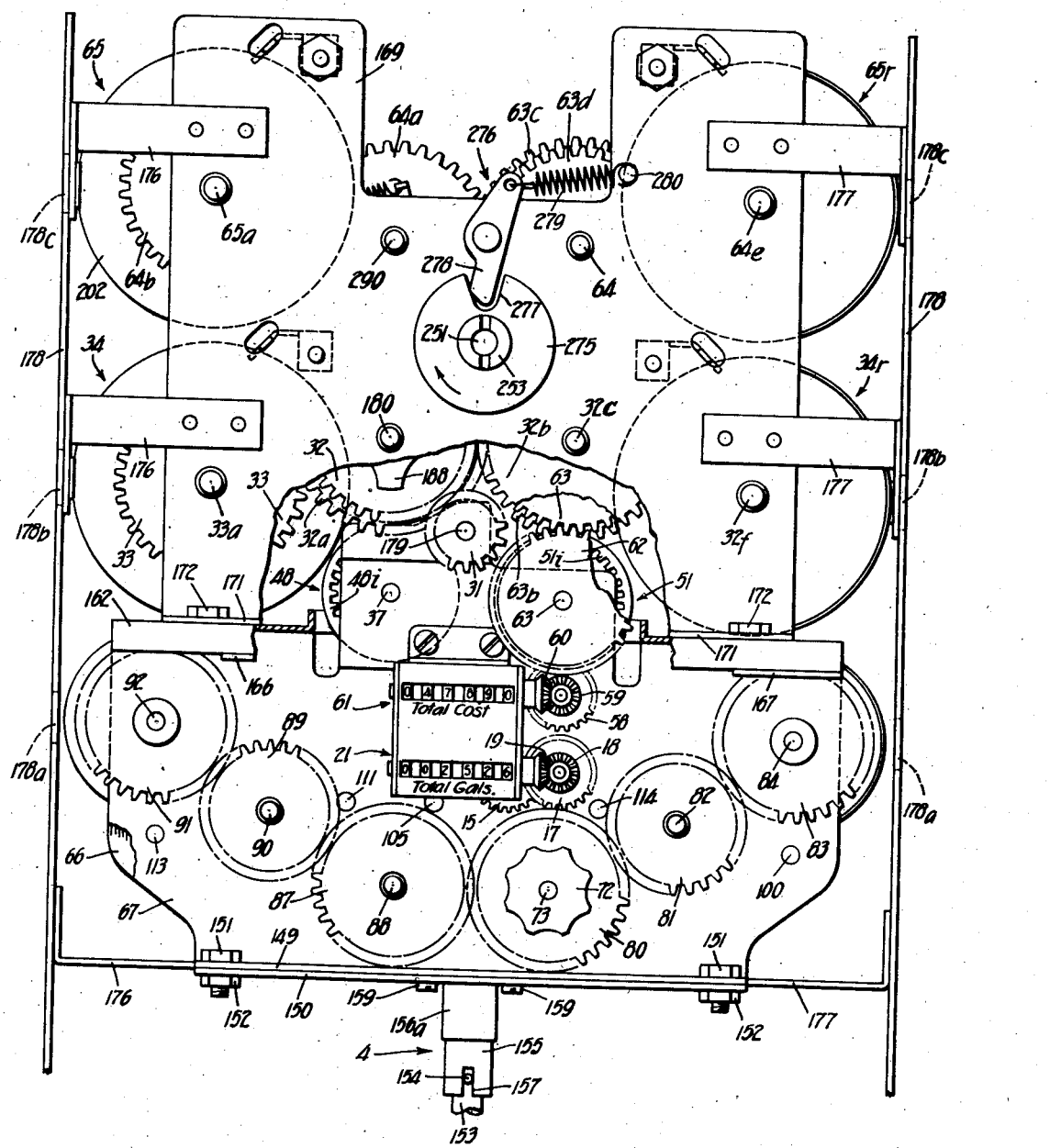
Figure 4 is a fragmentary view in side elevation of the apparatus as seen from the right of Fig. 5, portions being broken away for clearness of illustration.

The principal frame members of the lower unit are the side plates 66 and 67, Figs. 3, 4 and 9. These plates are formed with lower outturned flanges 148 and 149, to which a bottom plate 150 is secured by means of bolts 151 and nuts 152. The shaft or train 4 comprises a lower section 153 which is transfixed by a cross-pin 154, and an upper section 155, formed with a socket 156 (Fig. 9) for receiving the upper end of the shaft section 153, and with slots 157 for receiving the ends of the cross-pin 154. The upper shaft section 155 is journaled in a bearing sleeve 156a formed integral with a flange 158 which is secured to the bottom plate 150 by screws 159. The bevel gear 5 is affixed to the upper end of the shaft section 155.

The frame plates 66 and 67 have outturned flanges 160 and 161, Figs. 7 and 9, at the upper ends thereof, and these flanges are connected to a supporting plate 162 by means of bolts 163 and nuts 164. The supporting plate 162 is formed at its left side with a single supporting ear 165, and at its right side with supporting ears 166 and 167. These ears are made fast to the frame of the pump (not shown) by means of suitable fastening means such as bolts and nuts (not shown). The plate 162 is provided with a central opening through which certain parts of the lower unit extend upward.

The principal frame members of the upper unit consist of left and right frame plates 168 and 169, Figs. 3, 4 and 9, which are formed, respectively, with outturned lower flanges 170 and 171. The flanges 170 and 171 are secured to the supporting plate 167 by means of bolts 172 and nuts 173. Angle brackets 174 and 175, Figs. 3 and 6, are secured to the front and rear margins, respectively, of the frame plate 168. Similar angle brackets 176 and 177, Figs. 4 and 6, are secured, respectively, to the front and rear margins of the frame plate 169. An enclosing housing including plates 178 is secured to and supported from the angle brackets 174, 175, 176 and 177. The plates 178 have suitable sight openings 178a, 178b and 178c, Figs. 3 and 4, associated with the multiplicand indicators, the quantity registers and the sale price or money registers, respectively. The side frame plates 168 and 169 of the upper unit jointly support the quantity and sale price registers 34, 34r, 65 and 65r, and the transmission mechanism and the zero setting means therefor.

While the gears of the upper unit which constitute the input trains to the several registers 34, 34r, 65 and 65r have been briefly referred to, it is necessary to take up this part of the mechanism in somewhat greater detail, in order to point out the arrangement of these gears, which enables them to function as transposition mechanism with reference to the rear registers 34r and 65r, and also in order to make clear the relationship of the parts which is established for zero setting purposes.

The gear 32, Fig. 4, which constitutes a member common to the input trains of the registers 34 and 34r is rotatably mounted at the right-hand side of the machine adjacent the plate 169 upon a transversely extending shaft 180, Figs. 3, 4 and 21. This gear, it will be remembered, is driven by the gear 31 and is intended to drive both the registers 34 and 34r in a forward direction for input purposes, but to remain idle during zero setting operations. It is frictionally connected to drive the associated gear 32a, which is also loose upon the shaft 180. The gear 32a is driven forward by the gear 32 during input operations, and may also be driven backward during zero setting operations. During the latter operations it turns relative to the gear 32 by reason of the fact that the gear 32 is held against backward rotation, while frictional driving means provided between the gears 32 and 32a is sufficiently yielding to permit slippage to occur. The backward rotation of the gear 32 during zero setting operations is prevented by means which may include pawl and ratchet mechanism 183, Fig. 3, associated with the shaft 4 to prevent backward rotation of the shaft 4, and that, in turn, through the gear connections, which have been described from the shaft 4 to the gear 32, acts to prevent retrograde movement of the gear 32.

The frictional driving means for connecting the gear 32 to drive the gear 32a comprises a flange 186 on the gear 32a, Figs. 6 and 21, and between the gears 32 and 32a. The gear 32 is journaled upon the shaft 180 and is held against axial displacement leftward of the shaft 180 by a collar 187 fast on shaft 180. A cross-shaped leaf spring 188 is disposed between a washer 188a and the gear 32 to press the gear 32 against the flange 186 of gear 32a, and the latter gear, in turn, against the collar 187. As has already been pointed out, the gear 32a directly drives the wheel of lowest denomination of the register 34, and it is connected through gears 32b and 32d, Fig. 20, and shaft 32c to drive the lowest denomination wheel of the register 34r. Gear 32b is located near the right-hand end of the shaft 32c adjacent the frame plate 169, while the gear 32d is located near the left-hand end of the shaft 32c adjacent the frame plate 168, both gears being fast on the shaft. When the machine is viewed from what is called the "front" throughout this description, the lowest denomination wheels of the forward registers are at the observer's right, see Fig. 6, while the lowest denomination wheels of the rear registers are at the observer's left. It will be seen, therefore, that the gears 32b and 32d, together with the shaft 32c, constitute transposition mechanism for the register 34r.

The gears 63 and 63b, see Figs. 6 and 22, which are fast with one another, are revolubly mounted upon the shaft 32c and are fixed with relation to one another. The gear 63b drives the gear 63c which is revolubly mounted upon shaft 64, Fig. 21. The gear 63c is a common input member of the trains to the registers 65 and 65r. It drives the associated gear 63d, which is fast upon shaft 64, frictionally through friction produced by a cross-shaped spring 188x of the same construction as the spring 188. The gear 63d, it will be remembered, acts through gears 64a and 64b, Figs. 5 and 21, to drive the wheel of lowest denomination of the register 65. These parts are located at the right-hand side of the machine alongside the frame plate 169.

Figure 5:
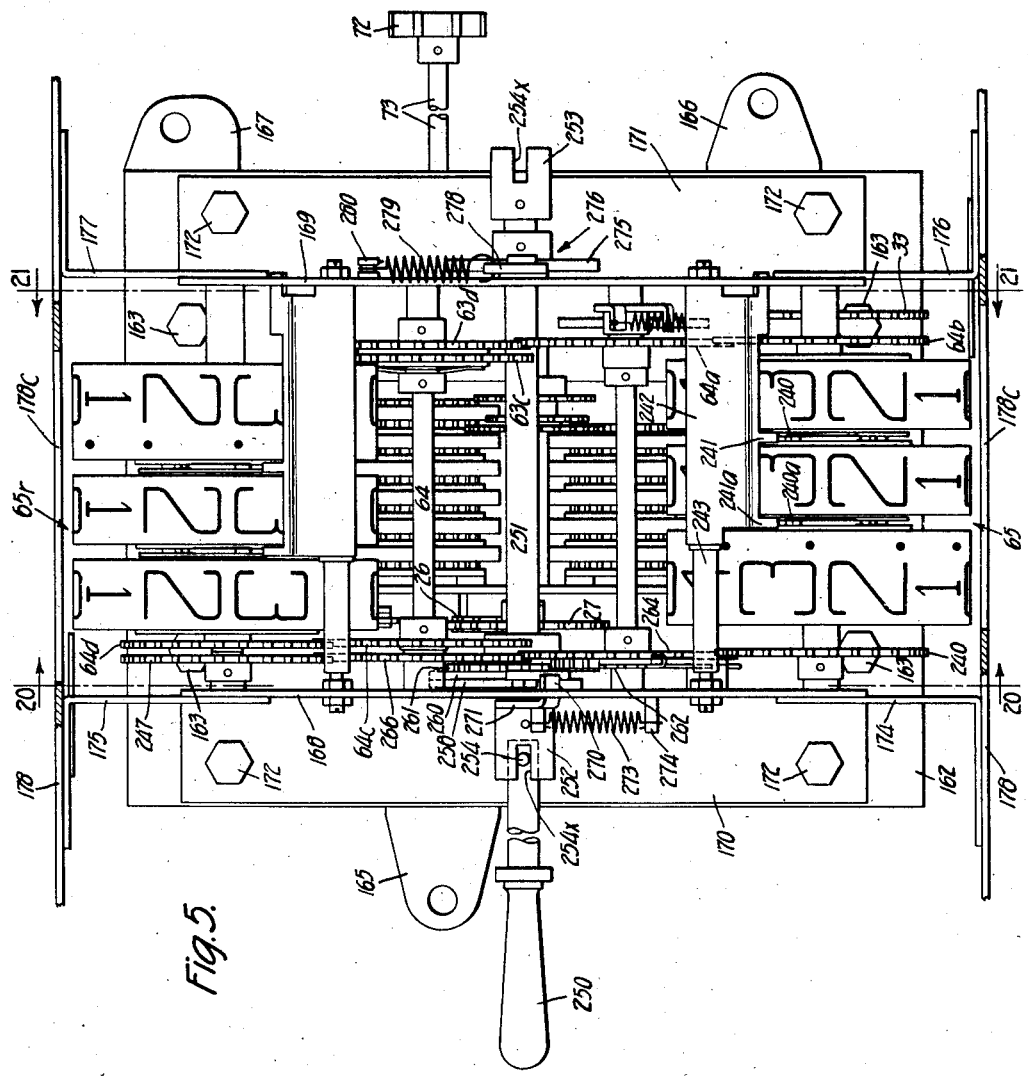
Figure 5 is a fragmentary plan view of the apparatus illustrated in Figures 3 and 4.

The driving gear 64c for the wheel of lowest denomination of the register 65r, Figs. 5, 20 and 22, is mounted fast upon the shaft 64 near the left-hand end of the shaft and adjacent the frame plate 168.

The gears 63d and 64c, together with the shaft 64, therefore, constitute transposition mechanism with reference to the rear register 65r.

Provision is made of zero setting mechanism common to all of the registers 34, 34r, 65 and 65r.

Before the zero setting mechanism external to the individual registers can be described, however, it is desirable to go into the matter of the construction of the individual registers sufficiently to make clear what character of zero setting mechanism is required.

The four registers 34, 34r, 65 and 65r are substantial duplicates of one another so that a description of one of them will substantially suffice for all. Details of the internal construction of the register 65 are illustrated in Figs. 23, 25 and 26. The illustrated counter comprises decimal denomination wheels 202, 203 and 204 which are coaxially mounted. Each denomination wheel has its circumference divided into ten equal number spaces and the numerals from zero to 9 are arranged in sequence on each wheel so that only one numeral can be observed at a time through the usual sight opening 178c of the register frame. As illustrated, the wheel 202 is the wheel of lowest denomination and is a cents units wheel.

The lowest denomination wheel 202, Fig. 23, is mounted fast upon a hub 214. The input gear 64b is also fast upon this hub. The hub 214 is revolubly mounted on the shaft 65a which extends between the side frame members 168 and 169.

A carry-over mechanism is provided for advancing the wheel 203, Fig. 23, one step at the conclusion of each complete revolution of the wheel 202. For carry-over purposes a Geneva disc 216 is mounted fast upon the hub 214.

The disc 216 is of circular contour, Fig. 25, and is formed with a single notch 217 in its periphery, which notch is bounded by a side lug or gear segment 218 affixed to the disc and representing what would be the equivalent of two teeth of a twenty tooth gear.

A pinion 219 is arranged to be driven step by step by the disc 216 and its segmental lug 218. The pinion 219 has an even number of teeth, of which alternate teeth 220 are long enough to extend across the plane of the disc 216 and to enter the notch 217 thereof. The other alternate teeth 221 are relatively short so that they escape engagement with the disc 216 at all times, but are capable of meshing with the teeth of the lug 218, see Fig. 23. The pinion 219 is journaled upon a bearing pin 222 which is riveted to a carrying arm 223, Fig. 25.

The carrying arm 223 is formed with a slot 224. The zero setting shaft 65a has grooves 224a, Fig. 23, formed in its opposite faces. The slot 224 receives that portion of the zero setting shaft which is reduced in thickness by the formation of the grooves. The arm 223 is formed with opposed notches 227 and 228, Fig. 25, which let into the slot 224. After the arm 223 has been slipped onto the shaft 215, a locking pin 229 is placed with its ends disposed in the notches 227 and 228 and with its side engaging the surface of the shaft 215 between the grooves formed in the shaft. The locking pin 229 is disposed between the hub 214 of the lowest denomination wheel and a corresponding hub 214a of the wheel 203, Fig. 23, of next higher denomination when the parts are fully assembled, and is thus held against accidental displacement from the slots 227 and 228. The arm 223 is disposed substantially in line with the midsection of the pinion 219, but is formed with an offset web 230 to which the bearing pin 222 is secured by upsetting.

The pinion 219 meshes with and drives a gear 231, Figs. 23 and 26, which is secured by means of pins 232 to a disc 233 and to a gear 234. The disc 233 is provided with a sleeve or hub portion 235, and the gears 231 and 234 are impaled upon the hub portion 235 at opposite sides of the body of the disc 233. The hub 235 is journaled upon a reduced portion of the hub 214a, and is retained in place, axially, by means of a retaining disc 236 which is driven upon a further reduced portion of the hub 214a.

The number wheel 203, which is of next higher denomination than the number wheel 202, is fixed upon the hub 214a. A latch 237 is pivotally mounted upon a bearing pin 238, the pin 238 in turn being secured to the web or side portion of the wheel 203 by upsetting. The latch 237 is rockable upon the pin 238 and is held thereon by the disc 233. The latch includes a finger 239 and a tail 240, Fig. 26. A light spring 240x is connected to the latch 237 and to the side of the wheel 203, and normally maintains the finger 239 fully engaged between two adjacent teeth of the gear 234. While the member 234 has been called a gear and looks like a gear, it it really a multiple notched detent wheel for coacting with the finger 239.

When the counter is being driven forward the wheel 202 and the disc 216 are turned through nearly a complete revolution, counter-clockwise in Figs. 25 and 26, before any effect is produced upon the carry-over mechanism. The pinion 219 is then rotated two tooth spaces and again locked by the disc 216. At this time, the zero setting shaft 65a is held stationary by means hereinafter described, so that the pinion 219 has no planetary movement. The pinion 219 in turn advances the gear 230 two tooth spaces, or a distance equivalent to one of the number divisions on the wheel 203. The gear 234 is carried forward in unison with the gear 231 and acts through the latch 237 to drive the number wheel 203 forward one number space. This action is repeated for each full revolution of the wheel 202 until, at the tenth revolution, the wheel 203 acts through carry-over mechanism to advance the wheel 204, Fig. 23, one number space.

The carry-over mechanism from the wheel 203 to the wheel 204 is the same as the carry-over mechanism from the wheel 202 to the wheel 203, which has now been described. Since no detailed description of the second carry-over mechanism is necessary, none will be given, but the corresponding parts have been designated by the same reference numerals with the subscript "a" added.

The shaft 65a at its left-hand end has fast with it a driving gear 244 which is adapted to be operated by zero setting mechanism to be described for zero setting purposes. When the gear 244 and the shaft 65a are operated in a direction contrary to the direction of advance of the wheels 202, 203 and 204 the carrying arms 223 and 223a are carried with the shaft 65a and serve to drive the latches 237 and 237a backward, clockwise in Figs. 25 and 26 and in register 65 of Fig. 21. The tail portions 240 and 240a, Figs. 5 and 23, upon reaching the zero position, strike against detent fingers 241 and 241a which form elements of a detent member 242 rockably mounted upon cross shaft 243. When the tail of either latch 237, 237a strikes its associated detent finger of member 241 or 241a it is restrained against further rearward movement, thus causing the member 237 to be swung about its pivot 238, to lift the finger 239 out of engagement with the gear 234. The gear 234 which is normally engaged with the finger 239 of the latch 237 is then free to continue its rearward movement independently of the latch 237 until the reverse rotation of the shaft 65a is complete.

The mechanism just described for zero setting purposes is effective to set the wheels 203 and 204 back to their zero positions. Additional zero setting mechanism is provided for setting the wheel 202, of lowest denominational order, back to its zero position.

The dial wheels of the register 34 are mounted upon the zero setting shaft 33a corresponding to the shaft 65a of register 65 and the shaft 33 has fast upon it a zero setting gear 245, Figs. 20 and 23, corresponding to the gear 244 of register 65. It will be noted that the input gears 33 and 64b of registers 34 and 65, respectively, are disposed at the right-hand side of the machine adjacent the lowest denomination wheels of their respective registers, and that the zero setting gears 245 and 244 are located at the left-hand sides of their respective registers.

The dial wheels of register 65r, Fig. 20, are mounted on the zero setting shaft 63e corresponding to the shaft 65a, and the shaft 63e has fast upon it a zero setting gear 247 corresponding to the gear 244 of the register 65. Similarly, the dial wheels of register 34r are mounted upon the zero setting shaft 32f which corresponds to the shaft 65a, and the shaft 32f has fast upon it a zero setting gear 249 corresponding to the gear 244. It will be observed that the zero setting gears 244, 245, 247 and 249 are all disposed at the left-hand side of the machine, Figs. 23 and 24, together with the input gears 64d and 32e, but that the input gears 33 and 64b, Fig. 23, are located at the right-hand side of the machine.

The two higher denomination wheels of each register are set back to zero through the zero setting gear of that register which has been referred to, but the lowest denomination wheel of each register is set back to zero by backward rotation of the input gear of that register.

All of the registers are simultaneously set back to zero by substantially a single revolution of a zero setting handle 250, Figs. 3, 5 and 20. A common zero setting shaft 251, see also Figs. 6 and 22, is journaled in the side frame members 168 and 169 and extends across the machine. It has fixed upon its opposite ends slotted collars 252 and 253. The handle 250 has its shaft portion transfixed by a cross pin 254. The shaft portion of the handle 250 is adapted to be slipped into either collar and to have the cross pin 254 lodged in a slot 254x of the collar. Thus the handle may be disposed on either side of the apparatus, and, when so disposed, is connected to drive the common zero setting shaft 251. The shaft 251 has fast upon it an arm 255, see particularly Figs. 20 and 22, having a slot 256 formed in it. The slot 256 receives a pin 257 which is fast upon a locking member 258. The locking member 258 is in the form of a latch pivoted at 259 upon an arm 260. The arm 260 is fast upon a gear 261 which drives gears 262 and 263, the latter gears being fast, respectively, with gears 264 and 265. The gear 264 meshes with and drives zero setting gear 244 of register 65, while the gear 265 meshes with and drives the zero setting gear 245 of register 34. The gears 264 and 265 also drive, respectively, gears 266 and 267, Fig. 20. The latter gears in turn are connected, respectively, to drive zero setting gears 247 and 249 of the registers 65r and 34r.

At the beginning of the zero setting operation of the handle 250 a finger portion 268 is lodged in a notch of a stationary disc 269 suitably secured to the frame plate 168. This holds the gear 261 against rotation. As the arm 255 is turned in a counter-clockwise direction, Fig. 20, the slot 256 moving relative to the pin 257 carries the pin 257 away from the axis of the common zero setting shaft 251, and hence rocks the arm or latch 258 about its pivot 259 to carry the finger portion 268 out of the notch of the stationary disc 269. When the forward extremity of the slot 256 comes into engagement with the pin 257, the finger 268 is clear of the disc notch and the further rotation of the arm 255 by the shaft 250 in a counter-clockwise direction, Fig. 20, serves to drive the gear 261 in a counter-clockwise direction, and hence to drive all of the zero setting gears 240, 245, 247, 249 in zero setting direction.

This action continues until near the end of a complete revolution of the shaft 251, Fig. 20, a tail member 258a of the arm 258 comes into engagement with a finger 270 formed on an arm 271. The arm 271, Fig. 3, is revolubly mounted upon the shaft 251 and the finger 270 extends through a slot 272, Figs. 3 and 22, formed in the side frame member 168. The arm 271 is normally drawn forward with the finger 270 in engagement with the forward end of the slot 272 by a coil spring 273, Figs. 3 and 5. The spring 273 is connected at one end to the arm 271 and at the opposite end to a pin 274 affixed to the frame member 168. When the tail portion 258a of the arm 258 engages the finger 270, it carries the arm 271 counter-clockwise with it until the finger portion of the arm 271 strikes the rear end of the slot 272, whereupon the shaft 251 and the handle 250 are arrested. Upon release of the handle, the shaft 251 and the handle are returned a short distance, by means hereinafter described, and since the shaft carries with it the slotted arm 255, the finger 268 is thrust downward and is re-engaged in the notch of disc 269 to lock the parts against further operation until zero setting is again required.

The return or retrograde movement of the shaft 251 is accomplished by means of a notched disc 275, Figs. 4, 5 and 22, fast on the shaft 251 and a pivoted dog 276 which cooperates with the disc. The dog 276 is normally engaged in the notch 277 of the disc 275. When the shaft 251 is rotated in a zero setting direction, however, a nose 278 of the dog 276 is cammed out of the notch against the tension of a coil spring 279. The spring 279 is connected to the tail portion of the dog 276 and to a pin 280 affixed to the side frame member 169. When rotation of the shaft 251, Fig. 3, is arrested by engagement of the finger 270 with the rear wall of the slot 272, the nose portion of the dog 276 is in position to engage the left wall of the notch 277, Fig. 4, and cam the disc 275 in the direction opposite to that in which the disc has been rotating with the shaft 251. This restores the finger 268 of arm 258, Fig. 20, to its locking position so that the gear 261 cannot again be turned until the handle 250 is operated in a counter-clockwise direction, Fig. 20, for that purpose.

The gears 261 to 267, inclusive, Fig. 20, are all locked against movement otherwise than in a zero setting direction by means of the pawl 258. Another detent pawl 281, Fig. 20, is employed and is urged into engagement with the gear 262 by means of a spring 282. The latter pawl is effective to hold the gear 261 during the above described retrograde movement of the shaft 251 or, in other words, while the arm 255 is returning to the position in Fig. 20, to lower the tooth 268 into the notch of the disc 269. The spring 282 is a light curved spring which is connected at one end to a tail portion of the detent pawl 281 and at the other end to the shaft 243.

The zero setting operation effected through the gears 261-267, inclusive, takes care of the setting back to zero of the two wheels of higher denomination of each of the four registers. The common zero setting shaft 251 also takes care of the setting back to zero of the lowest denomination wheels of all four of the registers in a manner now to be described.

The zero setting train for the wheels of lower denomination of the two lower registers 34 and 34r is operated from the gear 263, Fig. 20, through the shaft 180, upon which the gear 263 is made fast. It will be remembered that the gears 32 and 32a are loose upon the shaft 180, and that these gears are frictionally connected to one another. During zero setting operations the gear 32 is held stationary by the gear 31 even though the gear 32a is being turned. It will also be remembered that the gear 32 is a common input member to both of the lower registers 34 and 34r. Since these two registers are always operated in unison, that is, to the same extent, the setting back of the gear 32 to its original or zero position necessarily sets back the wheels of lowest denomination of the registers 34 and 34r to their zero positions.

The gear 32a is formed with a lug 283, Fig. 21, which extends toward the left from the plane of the gear near the central region thereof. An arm 284, see Fig. 6 also, is affixed to the collar 187 which it will be remembered is fast on shaft 180. The arm 284 has pivoted upon it at 284x a rocking lever 285, whose tail portion is connected through a coil spring 286 with one end of the arm 284. The inner face of the lever 285 between the pivotal support 284x of the lever and the point at which the spring 286 is connected is formed with a notch 288 which is adapted to receive and substantially fit the lug 283. During input operations the position of the shaft 180, and hence of the arm, is fixed. At that time one arm of a two-armed cam 289 engages an arcuate portion of the lever 285 and holds the notch 288 outward beyond the path of the lug 283 against the tension of the spring 286. Under these conditions the gear 32a can be rotated to an unlimited extent independently of the shaft 180.

The first effect of rotating the shaft 251 for zero setting purposes, and before there has been any turning whatever of the shaft 180, is to carry the cam 289 out of engagement with the lever 285. The notch 288 is thereby carried inward toward the path of the lug 283 so that as the lever 285 is carried around by the shaft 180 with its notched end trailing, it is in a position to have the inner surface of its notched end engage the lug and be cammed outward by the lug. When the notch 288 comes opposite the lug, the spring 286 causes the notch to snap over the lug, and from that point on the lever 285 and the gear 32a are turned in unison. Since the shaft 180 is arrested in a definite zero position, the notched lever 285 is necessarily carried around to a definite zero position, and the lever in turn carries the gear 32a around to a definite zero position. It will be remembered that the detent 281 prevents participation of the shaft 180 in the short retrograde movement of the common zero setting shaft 251, which occurs at the conclusion of a zero setting operation. The position of the shaft 180 is not, therefore, disturbed by this retrograde movement of the shaft 251. The cam 289 is, however, swung by the retrograde movement of the shaft 251 into position to engage the lever 285 and to rock the lever as seen in Figure 21, so that the notch 288 is again held definitely away from the path of the lug 283.

The mechanism for re-setting the lowest denomination wheels of the two upper registers 65 and 65a to zero is closely similar to that which has been described for the two lower registers. The zero setting gears 262 and 264, Fig. 20, are fast upon a shaft 290, and it is upon this shaft 290 that the gear 64a is freely mounted. The gear 64a is constructed like the gear 32a, and the connection from the shaft 290 to the gear 64a is in all respects identical with the connection from the shaft 180 to the gear 32a which has just been described. This connection comprises a rocking lever 285a which is acted upon by a second arm of the cam 289 in the same way that the arm 285 is acted upon by the first arm of the cam 289. Since the connection from shaft 290 to gear 64a, Fig. 21, are duplicates of the connections from the shaft 180 to the gear 32a, no further description of this part of the mechanism is deemed necessary, and corresponding reference numerals have been applied to corresponding parts with the subscript "a" added in each instance. It is evident that the setting back of the gear 64a to a zero position will necessarily serve through the gear 64b to set the units wheel of register 65 back to a zero position. Such zero setting of the gear 64a is also effective through the gear 63d, Figs. 20 and 21, shaft 64 and gears 64c and 64d to set the wheel of lowest denomination of the register 65r back to zero.

The two lower registers 34 and 34r, which are the quantity registers, have their wheels of lowest denomination graduated in tenths with the fractions written as common fractions not decimals, see Figs. 6 and 23. For that reason the lowest denomination wheels of the two lower registers are made relatively broad while the higher denomination wheels are made relatively narrow. The money registers 65 and 65r, on the other hand, are designed to show dollars and cents. In these registers the two wheels of lower denomination are both made relatively narrow, see Figs. 5 and 22, these being the units and tens wheels for showing cents, while the wheel of highest denomination which is adapted to show any amount up to nine dollars is made relatively broad so that each numeral appearing on the face of the wheel may be followed by a decimal point and set somewhat apart from the numbers on the cents wheels so as to emphasize the distinction between dollars and cents.

I have described what I believe to be the best embodiments of my invention. I do not wish, however, to be confined to the embodiments shown, but what I desire to cover by Letters Patent is set forth in the appended claims.

I claim:

1. In a multiplying machine, the combination with a multiplier input member and a product output member of a selective transmission train between said members to transmit the input to the output member in any one of a multiplicity of selected ratios, said transmission train comprising a multiplicity of differentials each having an individual input value, said values forming terms of a continuous geometric series whose common ratio is 2, said differentials adapted to be coupled for input purposes either individually or in combination, and multiplicand setting means including a single rotary setting member and control means operated thereby for controlling the individual differentials to determine the available multiplicands and compel them to be set up in predetermined sequence, said control means including detent means for dividing a rotation of the rotary setting member into twelve equal steps, a first selector train for the differentials other than the one of lowest input value to cause the transmission ratios effected by them at successive operations of the first train to form successive terms of an arithmetical series, a second selector train for the differential of lowest input value to cause the differential to be rendered active and inactive at alternate operations of the second train, and means rotatable by and in unison with the rotary setting member for advancing the first train at every step other than the third and ninth, and for advancing the second train at the third, fourth, ninth and tenth steps.

2. In a multiplying apparatus, in combination, a multiplier input member, a product output member, transmission means for transmitting the input to the output member comprising a multiplicity of differentials each adapted to act individually or in combination with any one of the others, and each having a definite individual input value, the input values of the several differentials forming a geometrical series whose common ratio is 2, multiplicand setting means comprising a single rotary multiplicand setting member advanceable step by step, and means controlled thereby for setting up selected multiplicands in predetermined sequence, said means comprising a first train advanceable step by step for controlling the input connections to all the differentials other than the differential of lowest individual input value to increase the setting by uniform increments at successive steps, a second train advanceable step by step for controlling the input connection of the differential of lowest individual input value to connect and disconnect said differential at alternate steps, and means operated by the multiplicand setting member for causing the first train to be advanced one step at each of a plurality of successive steps of the setting member but to have a dwell for one step of the setting member at periodic intervals, and for causing the second train to connect the differential of lowest value at the dwell step of the first train and to disconnect said differential at the next following step of the first train.

3. In a multiplying apparatus, in combination, a multiplier input member, a product output member, transmission means for transmitting the input to the output member comprising a multiplicity of differentials each adapted to act individually or in combination with any one of the others, and each having a definite individual input value, the input values of the several differentials forming a geometrical series whose common ratio is 2, multiplicand setting means comprising a single rotary multiplicand setting member advanceable step by step, means dividing the rotation of the setting member into twelve equal steps, and means controlled by the setting member for setting up selected multiplicands in predetermined sequence, said means comprising a first train advanceable step by step for controlling the input connections to all the differentials other than the differential of lowest individual input value to increase the setting by uniform increments at successive steps, a second train advanceable step by step for controlling the input connection of the differential of lowest individual input value to connect and disconnect said differential at alternate steps, and means operated by the multiplicand setting member for causing the first train to be advanced one step at each step other than the third and ninth steps of the rotary setting member, and for causing the second train to connect the differential of lowest value at the third and ninth steps of the setting member and to disconnect said differential at the fourth and tenth steps of the setting member.

4. In a multiplying machine, a multiplicand selector mechanism for making available in predetermined sequence a series of multiplicands which form an arithmetical series with intermittent interpolations, in accordance with a uniformly repeating cycle, in combination, an input member for setting up the multiplicands as stated, means for dividing rotation of the input member into a number of equal steps corresponding to the number of multiplicands made available in a whole number of cycles and multiplicand indicating means comprising denomination wheels, the lowest denomination wheel being a fractions wheel and being divided uniformly into number spaces equal in number to the number of multiplicands available in one rotation of the input member, and carry-over means for operating the second denomination wheel of the multiplicand indicating means a unit step at the end of each rotation of the wheel of lowest denomination.

5. A multiplying machine comprising the combination with a multiplier input member and a product output member, of a selective transmission train between said members to transmit the input to the output member in any one of a multiplicity of selected ratios, said transmission train comprising a multiplicity of differentials each having an individual input value, said values forming terms of a continuous geometrical series whose common ratio is 2, said differentials being arranged in two parallel banks so that differentials whose input values represent alternate terms of said geometrical series are in one bank and the other differentials whose input values represent the other alternate terms of said geometrical series are in the other bank, a series of multiplicand control cam units arranged in two sets, means supporting the cam units of one set, including a primary or input unit adjacent one of the banks for rotation about a first axis, means supporting the cam units of the other set adjacent the other bank for rotation about a second axis parallel to the first, and multiplicand setting mechanism comprising means for operating the primary unit, and carry-over gearing connected from unit to unit for causing the units of both sets to be operated from the primary unit, each cam unit being operative to control the connection and disconnection of one of the differentials to render it effective and ineffective.

6. A multiplying machine as set forth in claim 5 in which the gearing for directly interconnecting the cam units of the two sets comprises sets of Geneva carry-over gears, for driving a unit of one set from a unit of the other, and each of which alternately locks and advances the driven cam unit of the connected pair.

7. A multiplying machine as set forth in claim 5 in which the cams for controlling all the differentials other than the one of lowest individual input value are connected for operation as a single train but in which a second operating train is provided for controlling the differential of lowest individual input value, and in which the multiplicand setting mechanism includes means for operating the second train in a predetermined relation to the first.

PETER J. McLAREN.